United States Patent
Bailey

(10) Patent No.: US 9,073,684 B2
(45) Date of Patent: Jul. 7, 2015

(54) METHOD AND APPARATUS FOR NON-LINEAR DISPENSING OF SPECIFIC ITEMS ON DEMAND

(76) Inventor: Vern M. Bailey, New London, NH (US)

( * ) Notice: Subject to any disclaimer, the term of this patent is extended or adjusted under 35 U.S.C. 154(b) by 337 days.

(21) Appl. No.: 13/037,529

(22) Filed: Mar. 1, 2011

(65) Prior Publication Data

US 2011/0215109 A1 Sep. 8, 2011

Related U.S. Application Data

(60) Provisional application No. 61/310,424, filed on Mar. 4, 2010.

(51) Int. Cl.
*B65D 83/00* (2006.01)
*B65G 59/00* (2006.01)
*B65G 59/10* (2006.01)

(52) U.S. Cl.
CPC ............... *B65D 83/00* (2013.01); *B65G 59/10* (2013.01)

(58) Field of Classification Search
USPC .................... 221/69, 75, 89, 91–94, 122, 133
See application file for complete search history.

(56) References Cited

U.S. PATENT DOCUMENTS

| | | | |
|---|---|---|---|
| 3,694,044 A | | 9/1972 | Cummings |
| 4,072,251 A | * | 2/1978 | Huang ............................ 222/333 |
| 4,101,284 A | * | 7/1978 | Difiglio et al. ................. 221/264 |
| 4,545,577 A | * | 10/1985 | Randleman .................... 273/113 |
| 4,771,912 A | * | 9/1988 | van Wingerden ............... 221/75 |
| 4,872,591 A | | 10/1989 | Konopka |
| 5,086,947 A | | 2/1992 | Bragaglia |
| 5,445,294 A | * | 8/1995 | Gardner et al. .................... 221/1 |
| 5,502,944 A | | 4/1996 | Kraft et al. |
| 5,671,867 A | | 9/1997 | Cardenas |
| 6,293,800 B1 | * | 9/2001 | Robertson ...................... 434/196 |
| 6,523,825 B2 | * | 2/2003 | Francis ...................... 273/153 R |
| 7,123,989 B2 | | 10/2006 | Pinney et al. |
| 7,151,982 B2 | | 12/2006 | Liff et al. |
| 7,587,878 B2 | * | 9/2009 | Kim ................................ 53/246 |
| 7,689,318 B2 | * | 3/2010 | Draper .......................... 700/236 |
| 8,380,346 B2 | * | 2/2013 | Chudy et al. .................. 700/242 |
| 8,459,497 B2 | * | 6/2013 | Milan et al. ............... 221/150 R |
| 2006/0224414 A1 | | 10/2006 | Astrup et al. |
| 2007/0199950 A1 | * | 8/2007 | Eberle et al. ..................... 221/93 |

OTHER PUBLICATIONS

"AcuDose-RX", McKesson Automation Solutions, Brochure, 2010, 8 pages.
"MedCarousel" Brochure, McKesson Automation Solutions, Brochure, 2010, 2 pgs.
"Robotic Prescription Dispensing Systems", ScriptPro Pharmacy Automation, Brochure, 9 pgs.
"SP Automation Center (Space) Prescription Dispensing Automation Center", ScriptPro Pharmacy Automation, Brochure, May 2011, 2 pgs.
"Drugnest Robotic Warehouse for Automated Storage of Unit Doses", SwissLog Healthcare Solutions, Brochure, 2010, 2 pgs.

* cited by examiner

*Primary Examiner* — Gene Crawford
*Assistant Examiner* — Kelvin L Randall, Jr.
(74) *Attorney, Agent, or Firm* — Maine Cernota & Rardin

(57) ABSTRACT

A method and apparatus for secure, rapid, storage and dispensing of varied items from a random location in a storage matrix. Drawers are organized in a 'slice' or vertically-oriented frame that supports horizontal shifting of the drawers to dispense their contents. Slices can be combined to form matrices of automated, high-density, storage volumes and storage can coincide with dispensing.

20 Claims, 53 Drawing Sheets

300

FLOW CHART OF DISPENSING METHOD

4200

_US 9,073,684 B2_

METHOD AND APPARATUS FOR NON-LINEAR DISPENSING OF SPECIFIC ITEMS ON DEMAND

RELATED APPLICATIONS

This application claims the benefit of U.S. Provisional Application No. 61/310,424, filed Mar. 4, 2010. This application is herein incorporated by reference in its entirety for all purposes.

FIELD OF THE INVENTION

The invention relates to the storage and dispensing of items, particularly non-linear dispensing wherein stored items can be randomly accessed and dispensed through a linear motion from a random location within the dispenser.

BACKGROUND OF THE INVENTION

Existing inventory storage and dispensing systems are complex and inflexible. Pick-n-place robotic solutions involve complex articulated components and can require multiple steps for dispensing. Belt or carousel driven dispensers discharge items in a single-point linear fashion, often requiring significant delay for distantly spaced selections. In warehouses, flow rack and pallet rack systems exhibit such shortcomings. Similarly, storage delays are common when adding inventory. They can require involved, labor-intensive, inventory sequencing to properly allocate items to pre-defined sections. A-frame configurations waste space and can only be filled with one type of item. Other dispensing devices are also limited to dispensing items of the same size and shape, unable to store and dispense varied, irregular, or soft articles. The design of automated systems often precludes scaling, limiting the application to storage of either large or small items.

Medication storage and dispensing has particularly stringent requirements. It is vital that medications and prescriptions be accurately and securely stored. This applies in both institutional and home settings. Medication dispensers can require manual programming and complex inventory control steps. They can also be inflexible, requiring serial input and dispensing in a first-in first-out sequence.

Overall, traditional manual inventory stocking of bins and shelves introduces delays in the stocking and dispensing sequence. Manual selection of inventory from bins on shelves is labor-intensive, slow, and prone to security breaches. Inventory is vulnerable to damage, and access to some storage locations can be very cumbersome.

What is needed, therefore, is a scalable apparatus and method for secure storage with easy placement and rapid, efficient, dispensing of a variety of items.

SUMMARY OF THE INVENTION

Embodiments provide a scalable, automated, apparatus and method for secure storage. They provide easy, unattended, placement and rapid, efficient, dispensing of varied items. Drawers are organized in a 'slice' or vertically-oriented frame that supports horizontal shifting of the drawers to dispense their contents. Slices can be combined to form matrices of automated, high-density, storage volumes.

Embodiments include a system for the dispensing of products, the system comprising at least one drawer slice; a plurality of drawers, each incorporated in the drawer slice; optionally, a plurality of containers, each enclosed within one of the drawers; and a delivery apparatus, wherein the delivery apparatus dispenses the contents of a selected drawer of the plurality of drawers.

Other embodiments provide a method for storing and dispensing items comprising the steps of providing an item to be stored in a dispenser; placing the item to be stored in a random location within the dispenser; automatically associating the item to be stored with the random location after the item to be stored is placed in the dispenser; identifying an item for dispensing; locating the item in the dispenser; identifying row and or column of location of the item; optionally locking at least one drawer or shelf in at least one row or column based on the location of the drawer; shifting at least one drawer or shelf whereby the item is removed from its drawer by non-contact force.

In some embodiments, the movement of drawers may be accomplished by mounting the drawers on guide rails and coupling the drawers to motors by pull wires or other suitable means. The drawers may be selectively engaged to the pull wires through the use of magnets, solenoids or other suitable means. Any of various desired combinations of drawers may be engaged or released permitting flexibility in the selection of which drawers are to be moved and what distance they are to be moved.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
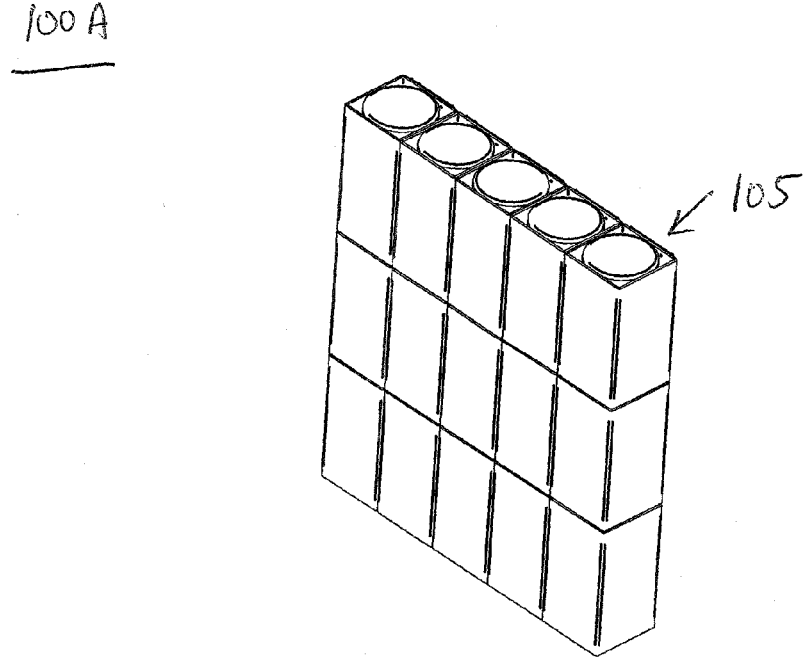
FIGS. 1A-1G are diagrams depicting drawer motions for nonlinear vending of items configured in accordance with one embodiment of the present invention.
Figure 1A:
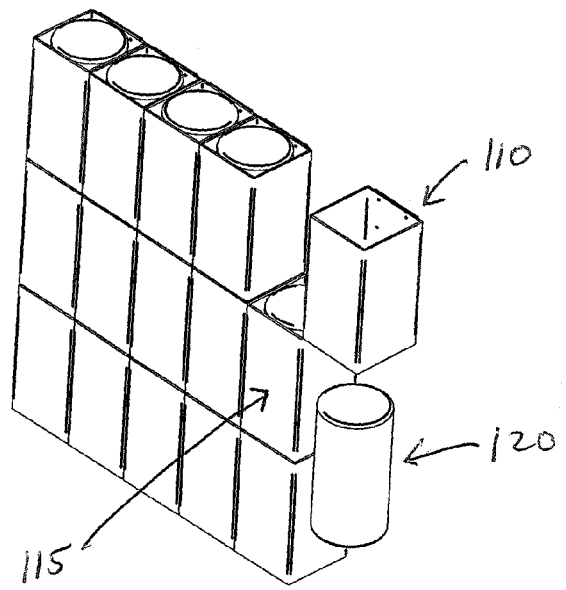

The invention is susceptible of many embodiments. What follows is illustrative, but not exhaustive of the scope of the invention.

In the description, relative terms such as "horizontal," "vertical," "up," "down," "top" and "bottom" as well as derivatives should be construed to refer to the orientation as then described or as shown in the drawing figure under discussion. These relative terms are for convenience of description and normally are not intended to require a particular orientation. Terms including "inwardly" versus "outwardly," "front" versus "back" and the like are to be interpreted relative to one another or relative to an axis as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" refers to such an attachment, coupling or connection that allows the pertinent structures to operate as intended by virtue of that relationship. Gravity feed or similar terminology is intended to include centrifugal force as from rotated dispensing components.

Where the terms medication and prescriptions are used, they are not intended to limit the scope of the invention to drugs available only on a prescription of a licensed medical doctor, but to include oral solids, vitamins, dietary supplements, over the counter drugs, homeopathic or herbal remedies, any item taken that is available, for example, in capsule, caplet, tablet, pill or other solid form.

Nonlimiting embodiments provide storage for groceries, parts, library inventory, files, temporary storage such as willcall, and bicycles.

Elements of embodiments of the invention comprise slice components registering drawers, drawers that are free to move or are locked from movement, one or more drawer engagement components, drawer locking components, drawer locomotion components, bottom row drawer supports, drawer locator/location components, drawer inventory tracking components, and an enclosure containing the components.

Operation of embodiments of the invention comprise motion of drawers below the dispensing drawer to shift them to clear a dispensing path. Drawers above shift to prevent undesired dispensing of items above the dispensed item's drawer. Filling can be accomplished in any order, with the system automatically tracking drawer location with item information as in a database. Similarly, item dispensing can be accomplished by providing item information, with the system accomplishing drawer location and dispensing steps automatically. The enclosure containing the drawers can provide security by sealing them from manual access. Multiple slices of drawers can be stacked beside each other to provide scalable storage, expanding the system from a two-dimensional matrix to a three-dimensional matrix. Simplicity of design supports economy, reliability and rapid drawer motion, quickly dispensing selected items.

FIGS. 1A-1G are diagrams depicting drawer motions for nonlinear vending of items. Related, similar, figure items are generally similarly numbered. Locked drawers are an example. As depicted in embodiments, for scenarios, drawers move far enough so that contents do not fall. One-half step move is typical, but any move blocking contents of drawer is sufficient.

FIG. 1A depicts a first drawer motion 100A for nonlinear vending of items. Components comprise item to vend 105, drawer moved a full step 110, locked drawer 115 held to prevent motion from friction of drawer moved a full step 110, and dispensed item 105 falling free 120. Note that some items may be light enough that drawer movement does not influence the other drawers and drawer locking is avoided.

Figure 1B:
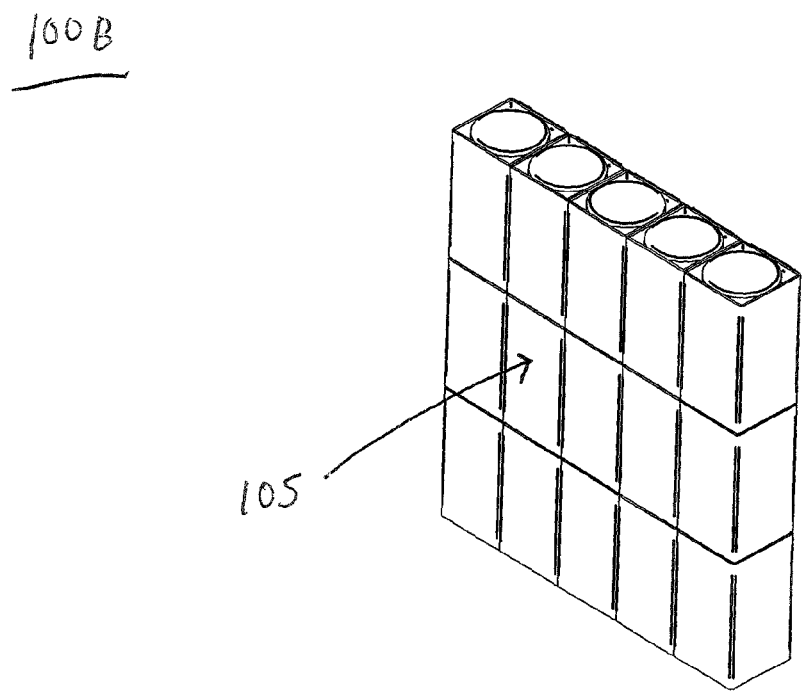
Figure 1B:
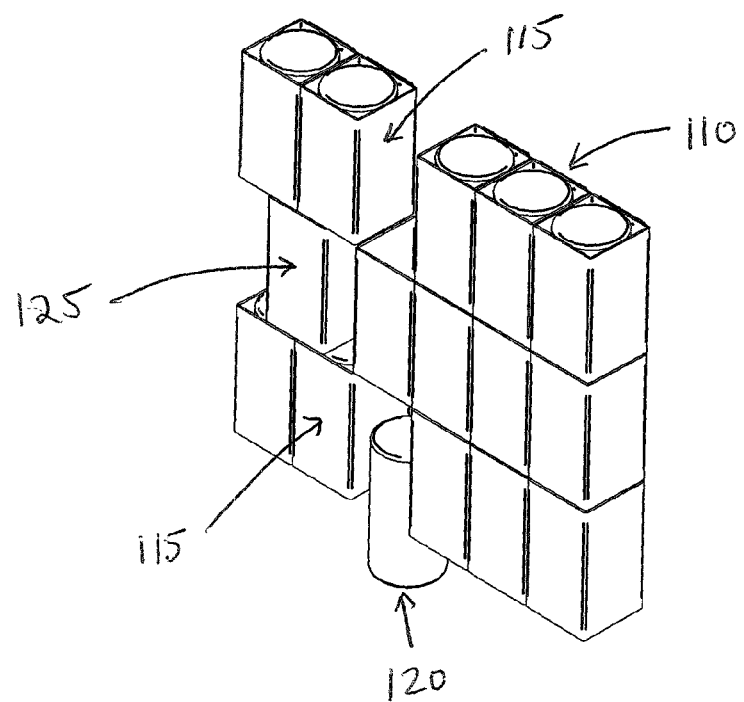

FIG. 1B depicts drawer motions 100B for nonlinear vending of items. Components comprise location of item to vend 105, drawers moved a full step 110, locked drawers 115 held to prevent motion from friction of drawer moved, drawer moved ½ step 125, and dispensed item falling free 120.

Figure 1C:
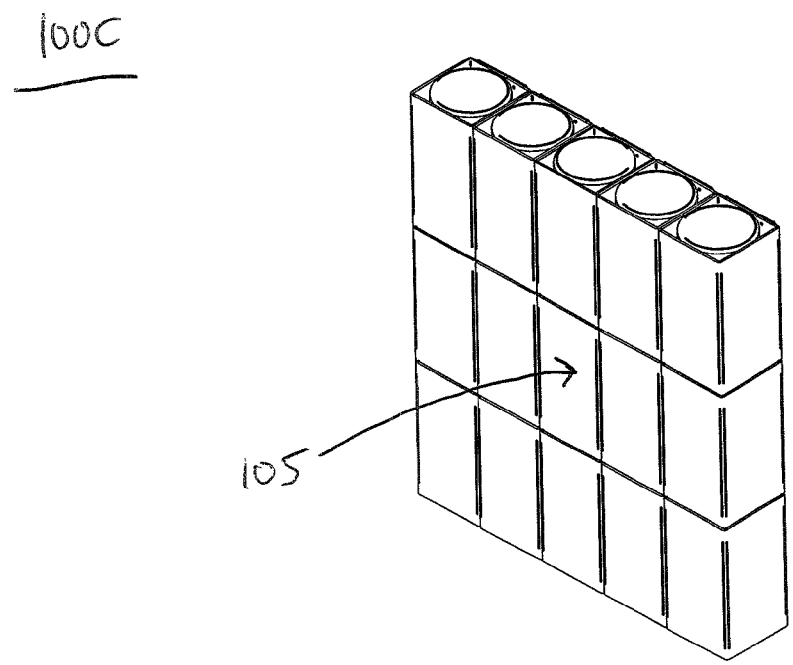
Figure 1C:
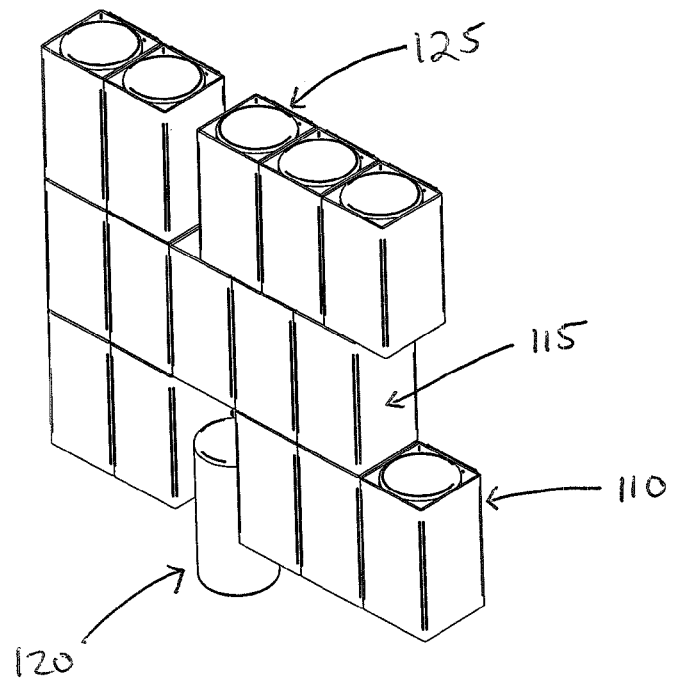

FIG. 1C depicts drawer motions 100C for nonlinear vending of items. Components comprise location of item to vend 105, drawers (below) moved a full step 110, locked drawer 115, drawers (above) moved ½ step 125, and dispensed item falling free 120.

Figure 1D:
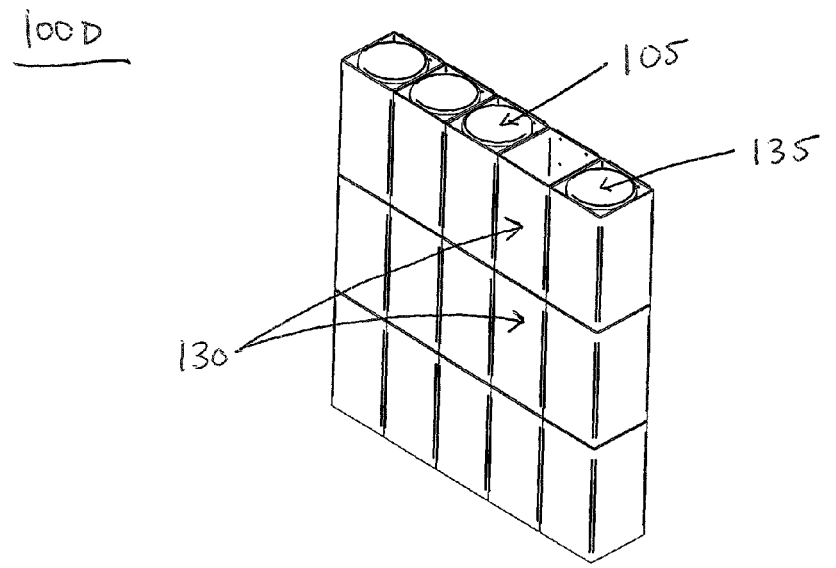
Figure 1D:
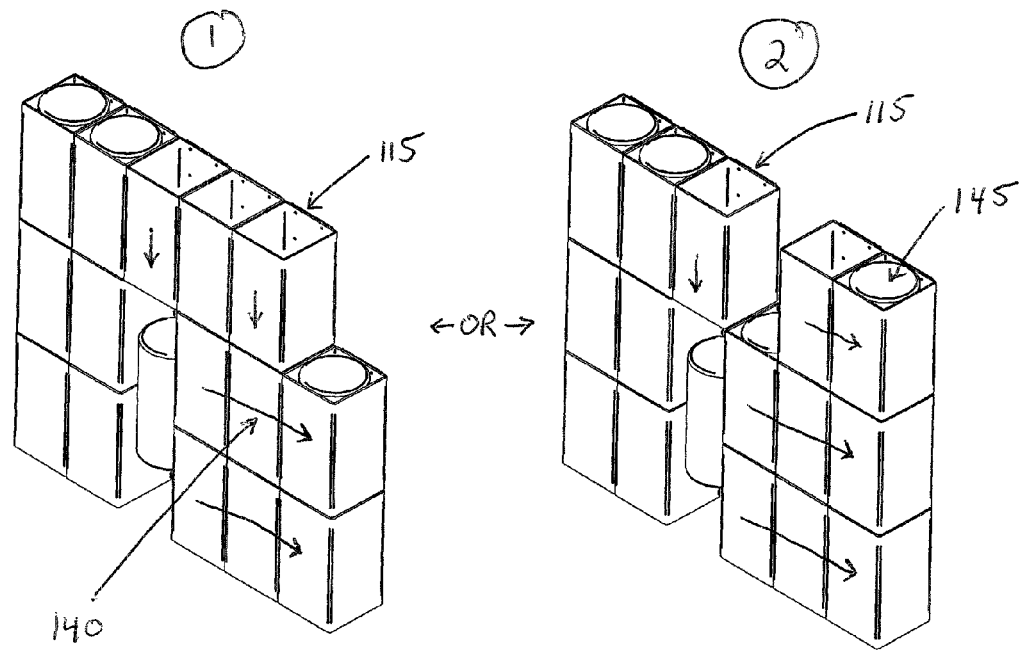

FIG. 1D depicts drawer motions 100D for nonlinear vending of items. Embodiments provide for relocating item to empty lower drawer or maintaining its location. Components comprise location of item to vend 105, empty drawers 130, and item to drop into empty drawer 135. Alternative 1, on the lower left, shows locked drawer 115, and item dropping into empty drawer 140. This is followed by alternative 2, on the lower right, without dropping into empty drawer comprising locked drawer 115 and item remaining in original drawer 145.

Figure 1E:
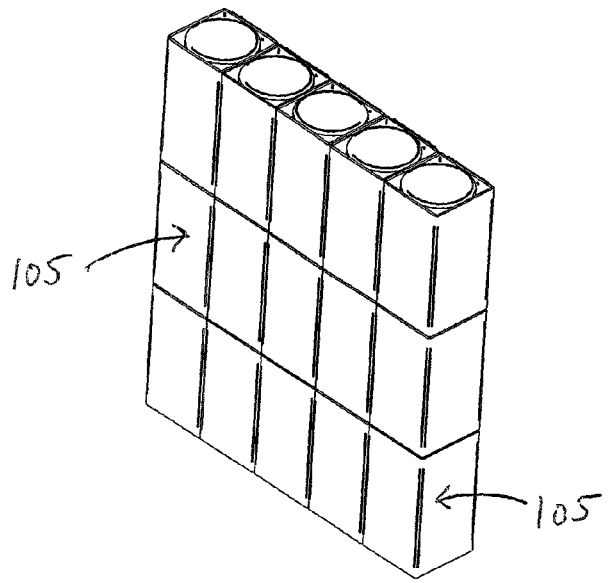
Figure 1E:
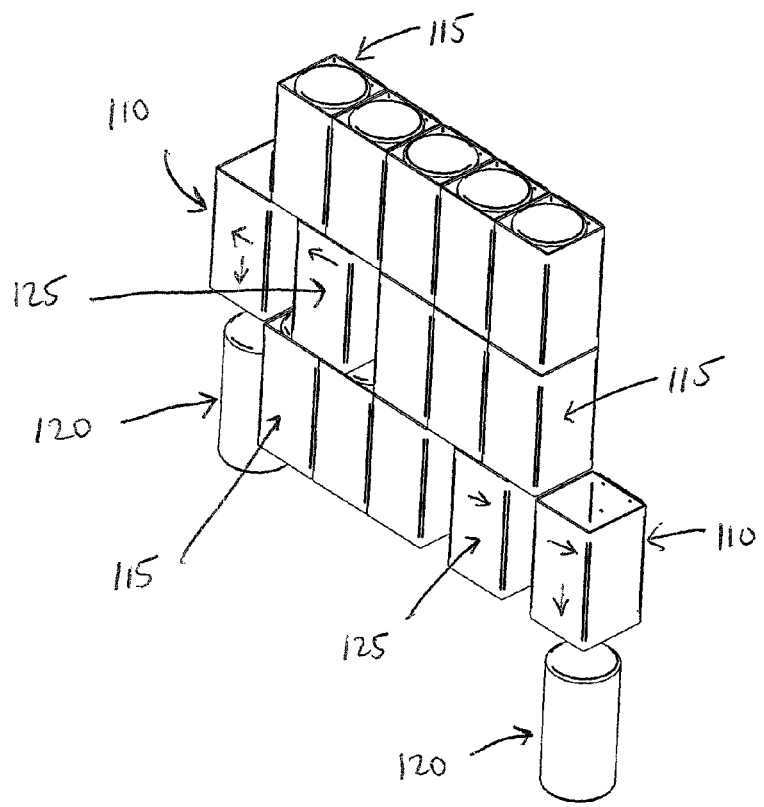

FIG. 1E depicts drawer motions 100E for nonlinear double vending of items. Components comprise location of items to vend 105, drawers moved a full step 110, locked drawers 115, drawers moved ½ step 125, and dispensed items falling free 120.

Figure 1F:
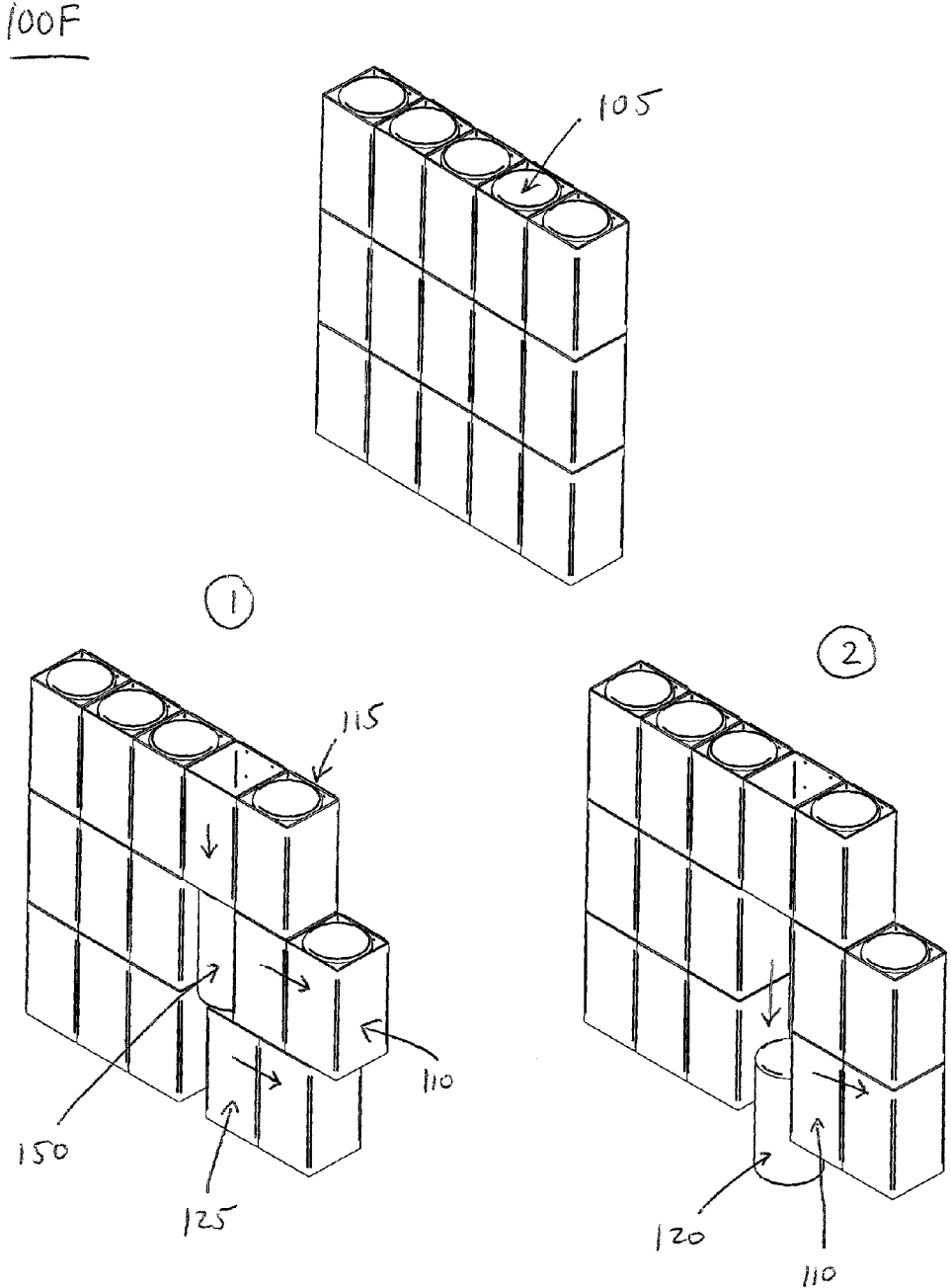

FIG. 1F depicts drawer motions 100F for nonlinear soft drop vending of items. Soft drop can be employed to diminish forces on an item being dispensed. First operation components comprise item to vend 105, drawer moved a full step 110, drawer moved ½ step 125, and item falling length of one drawer 150. Second operation components comprise drawer moving full step 110 and item falling freely 120.

Figure 1G:
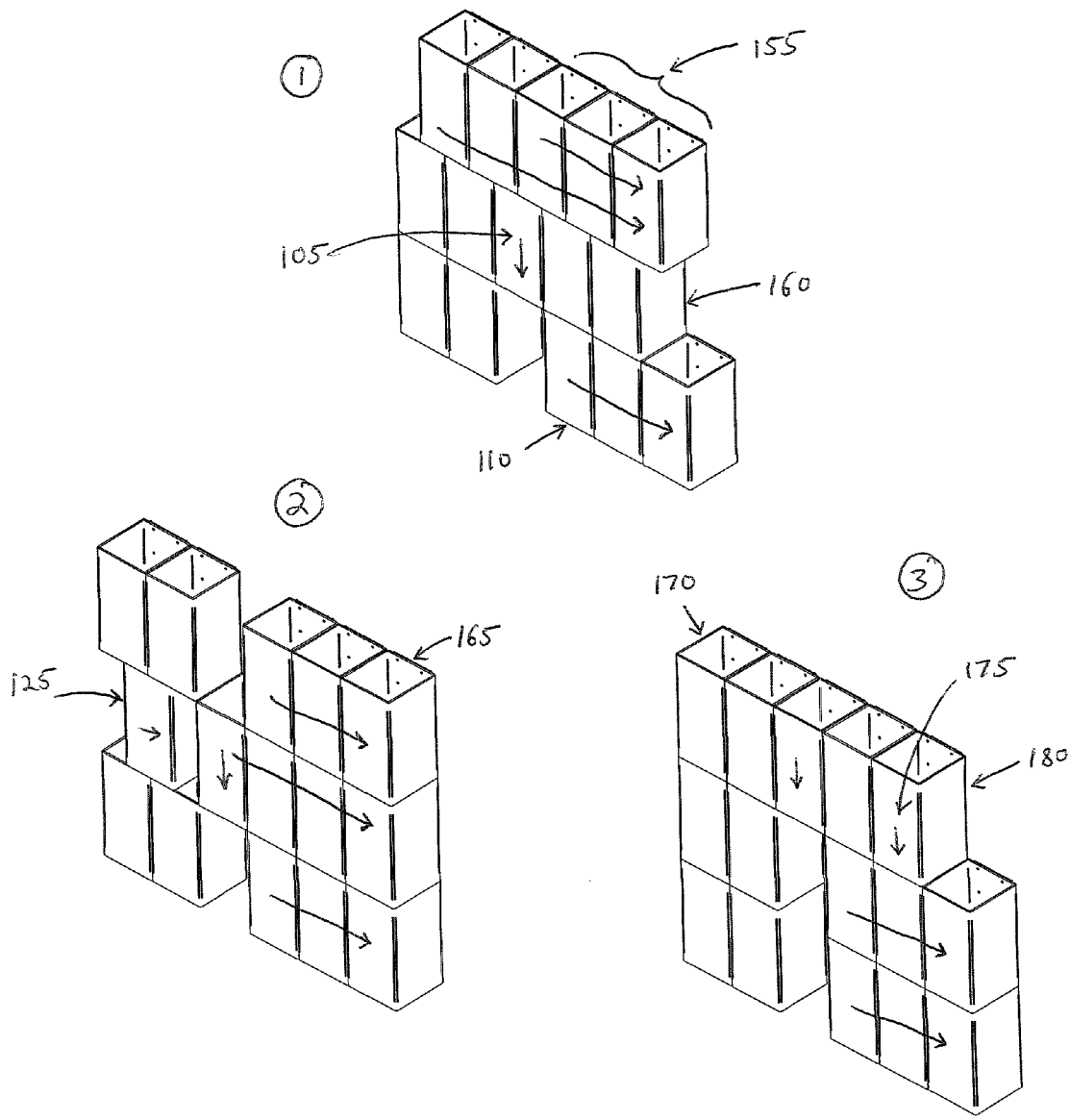

FIG. 1G depicts drawer motions 100G for nonlinear vending of items. Components for image 1 comprise drawer for item to vend 105, note that only three drawers need be moved ½ step (not entire row) 155, drawer moving full step 110, and first drawer held to prevent motion from friction of other drawers 160. Components for image 2 comprise drawer moved ½ step to block above drawers 125, and end position 165. This method involves 'leaving' drawer behind after ½ move and continuing with remaining drawers to end position. This can also involve 'locking' additional drawers. Components for image 3 comprise home position 170, and first drawer held to prevent motion from friction of other drawers 175. Containers may relocate from an upper to a lower row with this method 180.

Figure 2:
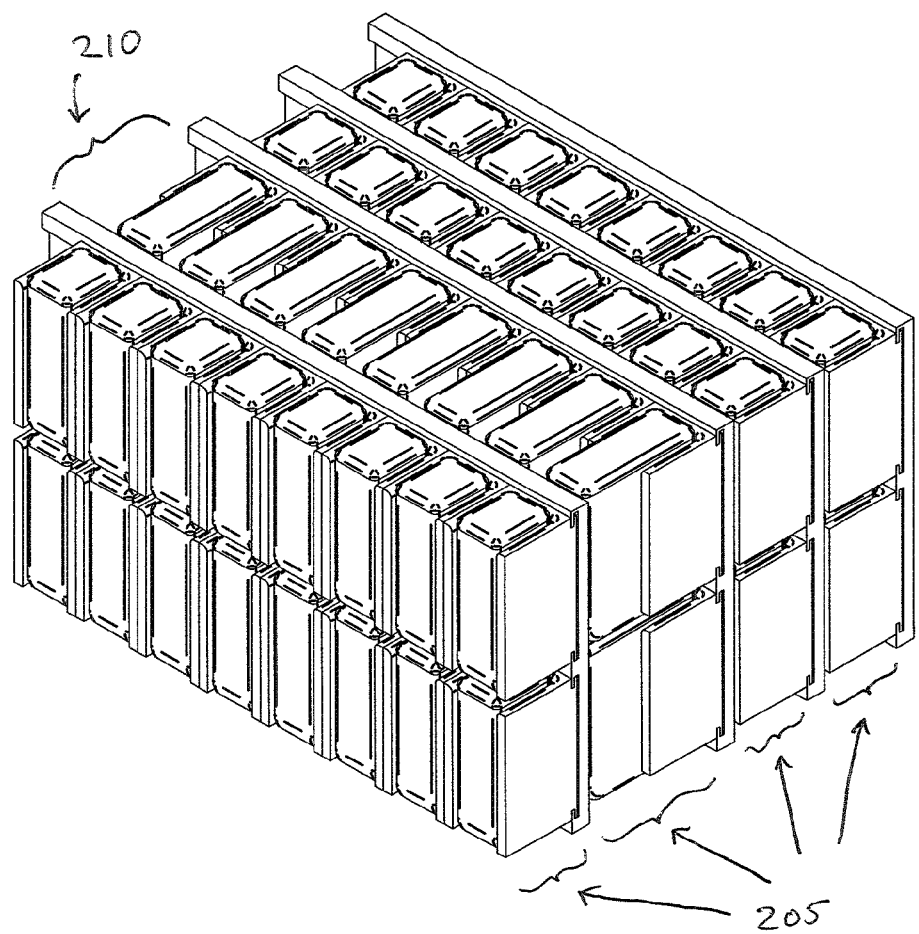
FIG. 2 is an open ended drawer assembly configured in accordance with one embodiment of the present invention.

FIG. 2 is a diagram 200 illustrating an open ended drawer assembly embodiment. It depicts slices 205 with variable separation. Due to greater separation, slice 210 supports larger drawers than the other slices. Modular arrangement of slices provides both flexibility and standardization.

Figure 3:
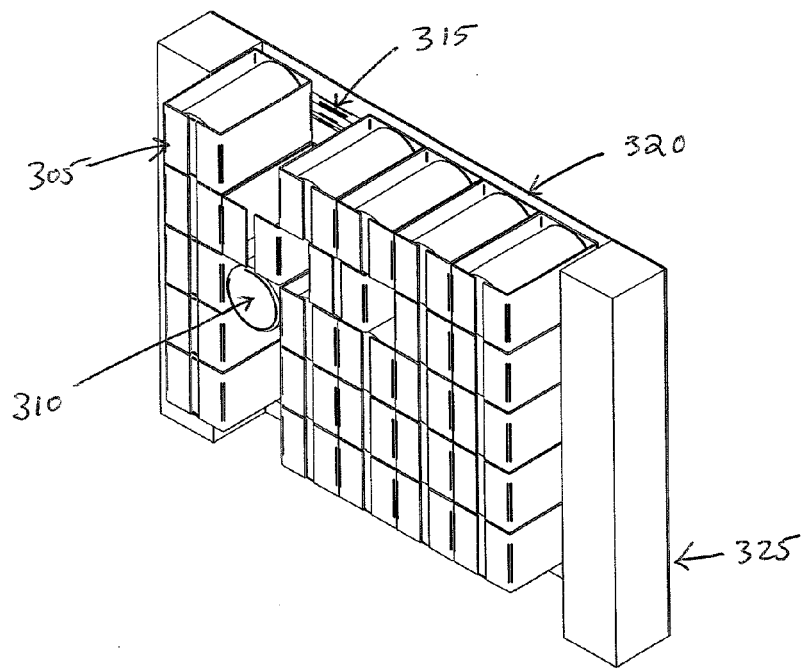
FIG. 3 is a diagram illustrating a slice containing drawers mounted on guide rails configured in accordance with one embodiment of the present invention.
Figure 3:
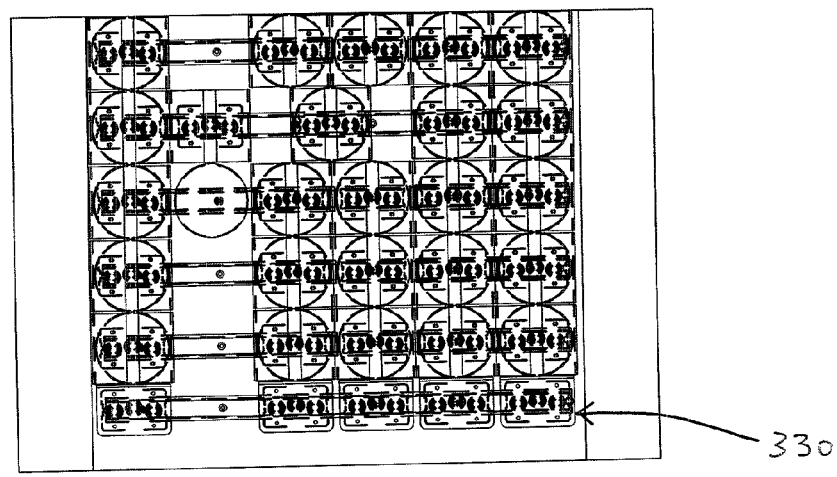

FIG. 3 is a diagram 300 illustrating a slice containing drawers mounted on guide rails. Round containers placed horizontally "nest" when moved across other containers. This "nesting" can cause friction. Containers could fall off center due to uneven weight distribution. Containers placed vertically fall straighter, without binding. Components comprise drawer 305, container 310, guide rail 315, sheet metal support 320, frame post 325, and bottom support 330.

Figure 4:
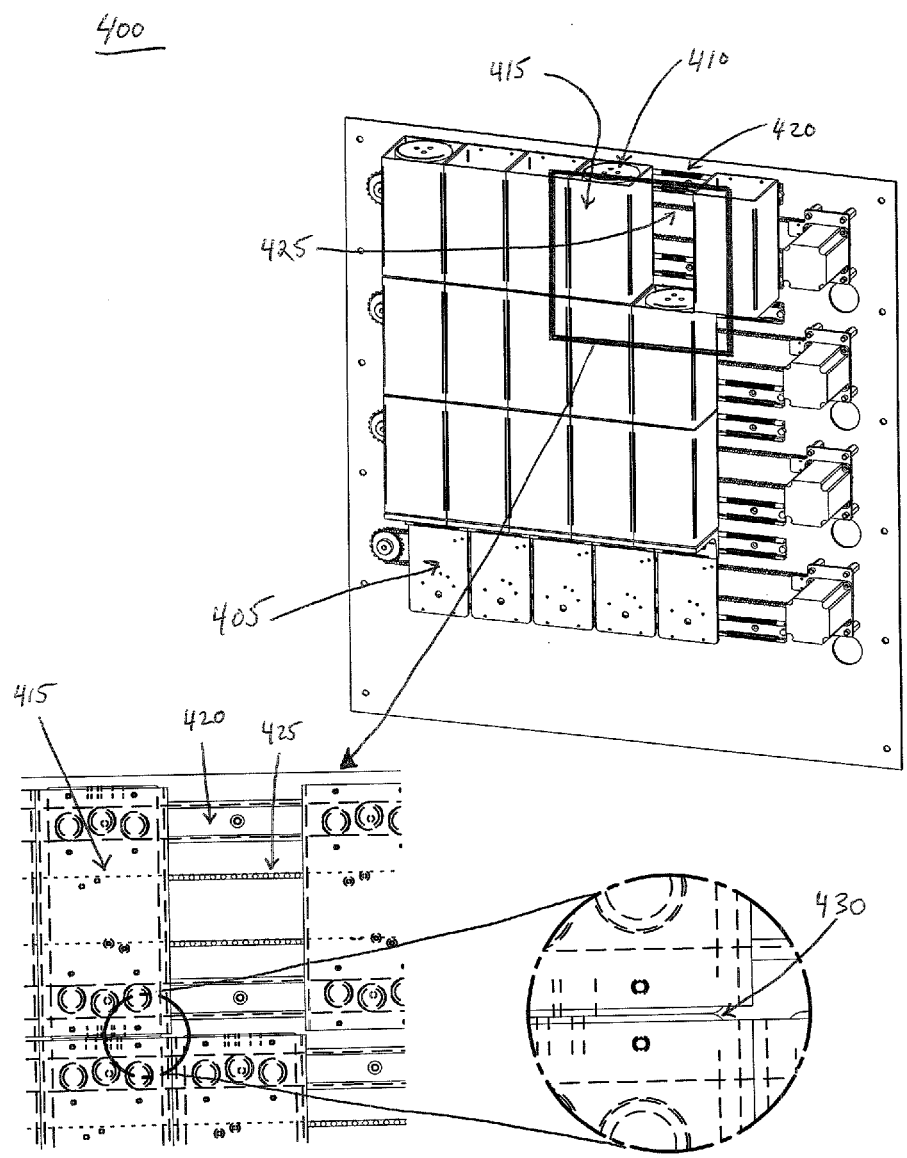
FIG. 4 is a diagram illustrating a slice containing components and 15 drawers configured in accordance with one embodiment of the present invention.

FIG. 4 is a diagram 400 illustrating, with insets, a slice containing components and 15 drawers. For embodiments, containers are always longer than the drawers. This allows the containers to slide freely. The gap 430 between drawers can vary, but should not be so large as to allow the containers to bind if they get off-center. Bottom row 405 is designed to carry the combined weight of all the containers above. Components comprise pull chain 425, drawer 415, container 410, and guide rail 420. Note that the bottom row typically comprises shelf support of columns above.

Figure 5:
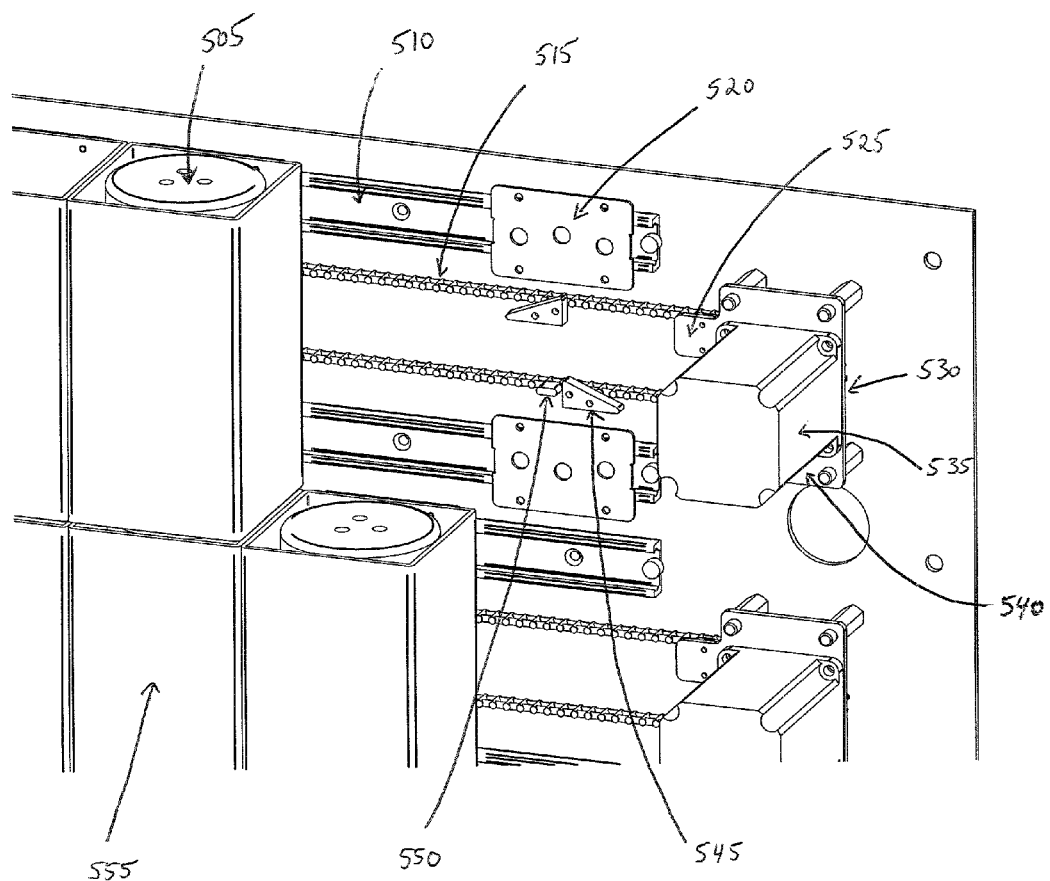
FIG. 5 is a diagram illustrating an enlargement of a slice containing components and 15 drawers of FIG. 4 configured in accordance with one embodiment of the present invention.

FIG. 5 is a diagram 500 illustrating detail of FIG. 4 Components comprise container 505, guide rail 510, pull chain 515, slider to attach to drawer (not shown attached) 520, photo sensor 525, sprocket 530, stepper motor 535, motor mounting plate 540, engagement wedge 545, engagement tab 550, and drawer 555.

Figure 6:
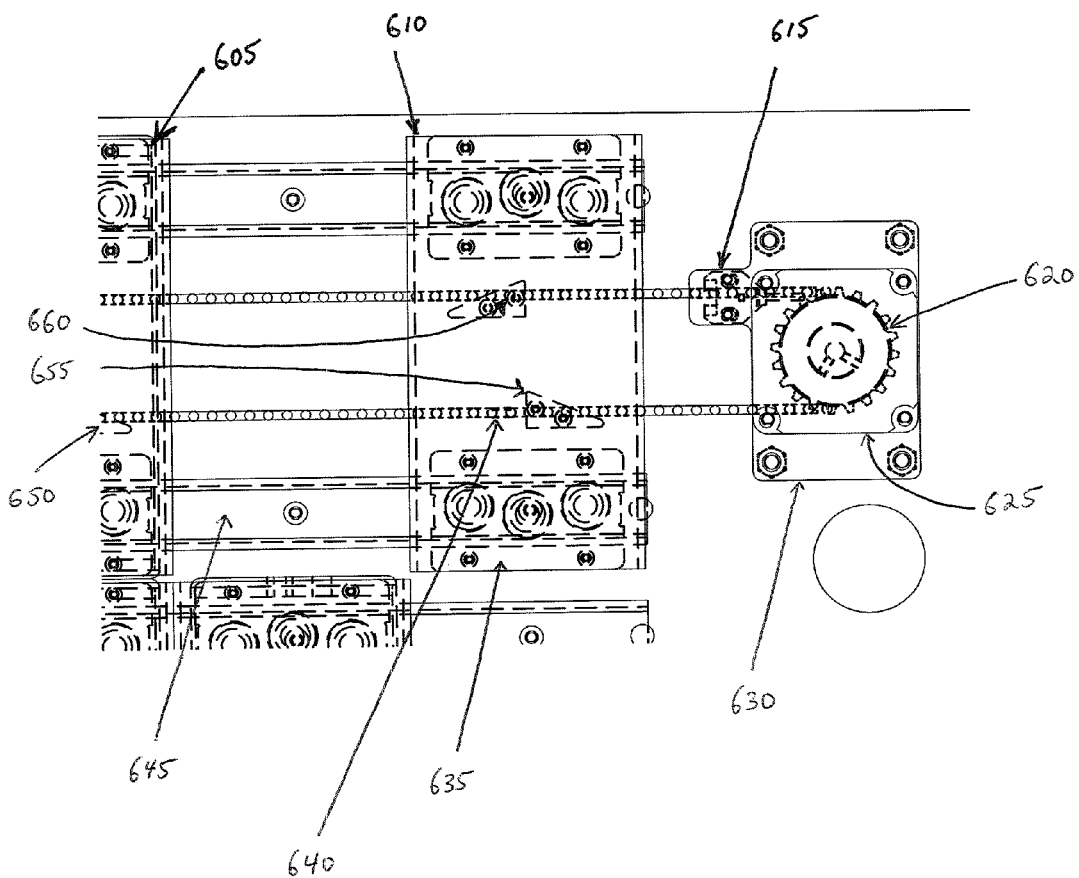
FIG. 6 is a diagram illustrating details of components of FIG. 4 configured in accordance with one embodiment of the present invention.

FIG. 6 is a diagram 600 illustrating a further detail of FIG. 4. Components comprise container 605, drawer 610, photo sensor 615, sprocket 620, stepper motor 625, motor & sensor bracket 630, roller slide 635, engagement tab fixed to chain 640, guide rail 645, pull chain 650, lower engagement wedge 655, and top engagement wedge 660.

Figure 7:
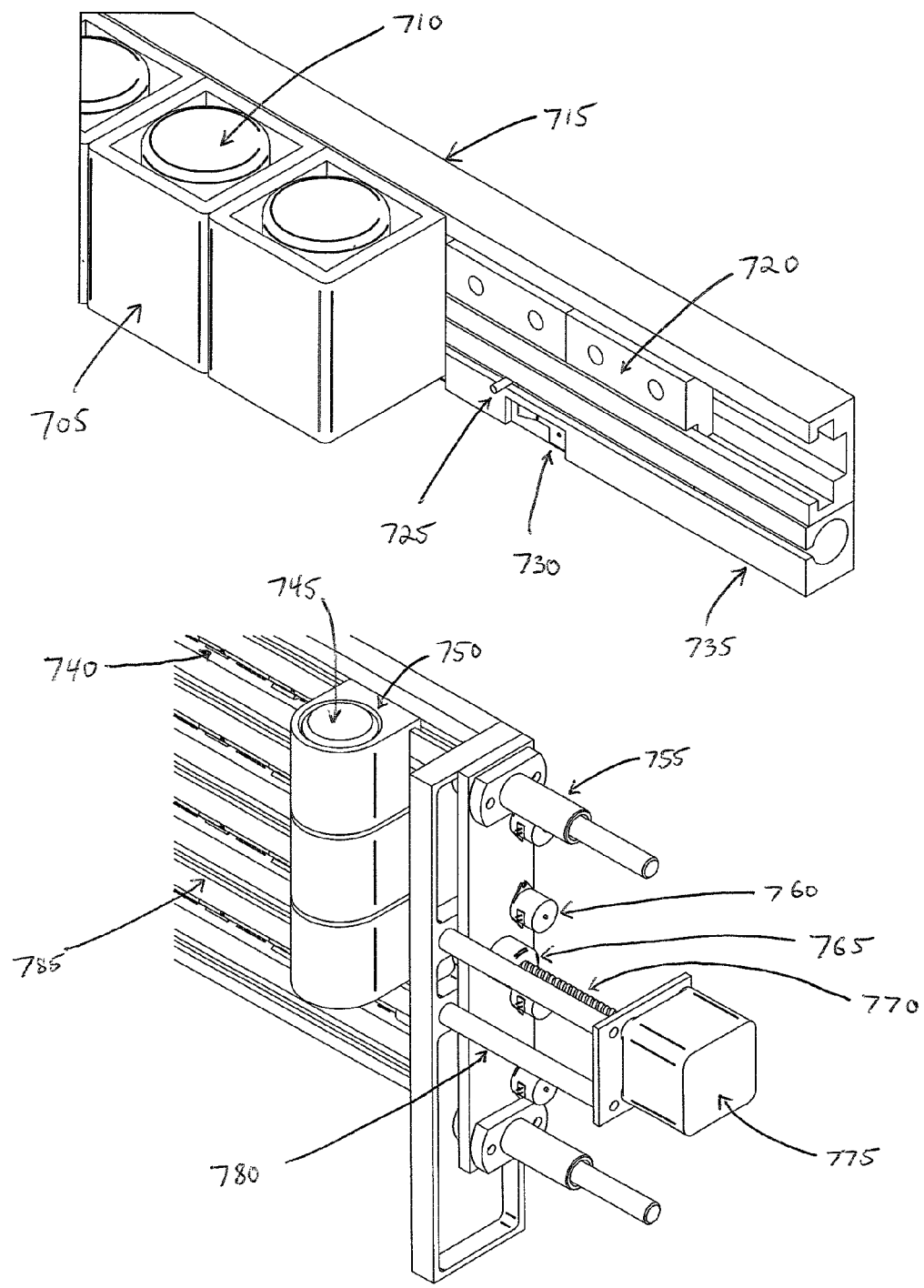
FIG. 7 is a diagram illustrating segmented pull rod components configured in accordance with one embodiment of the present invention.

FIG. 7 is a diagram 700 illustrating embodiments of segmented pull rod components. Components comprise drawer 705, container 710, guide rail 715, slider 720, engagement pin (attached to back of drawer) 725, friction clip 730, guide for segmented pull rod 735, segmented pull rod 740, container 745, drawer 750, guide bushing 755, stepper motor 760, lead nut 765, lead screw 770, stepper motor 775, support pillars 780, and guide rails 785.

Figure 8:
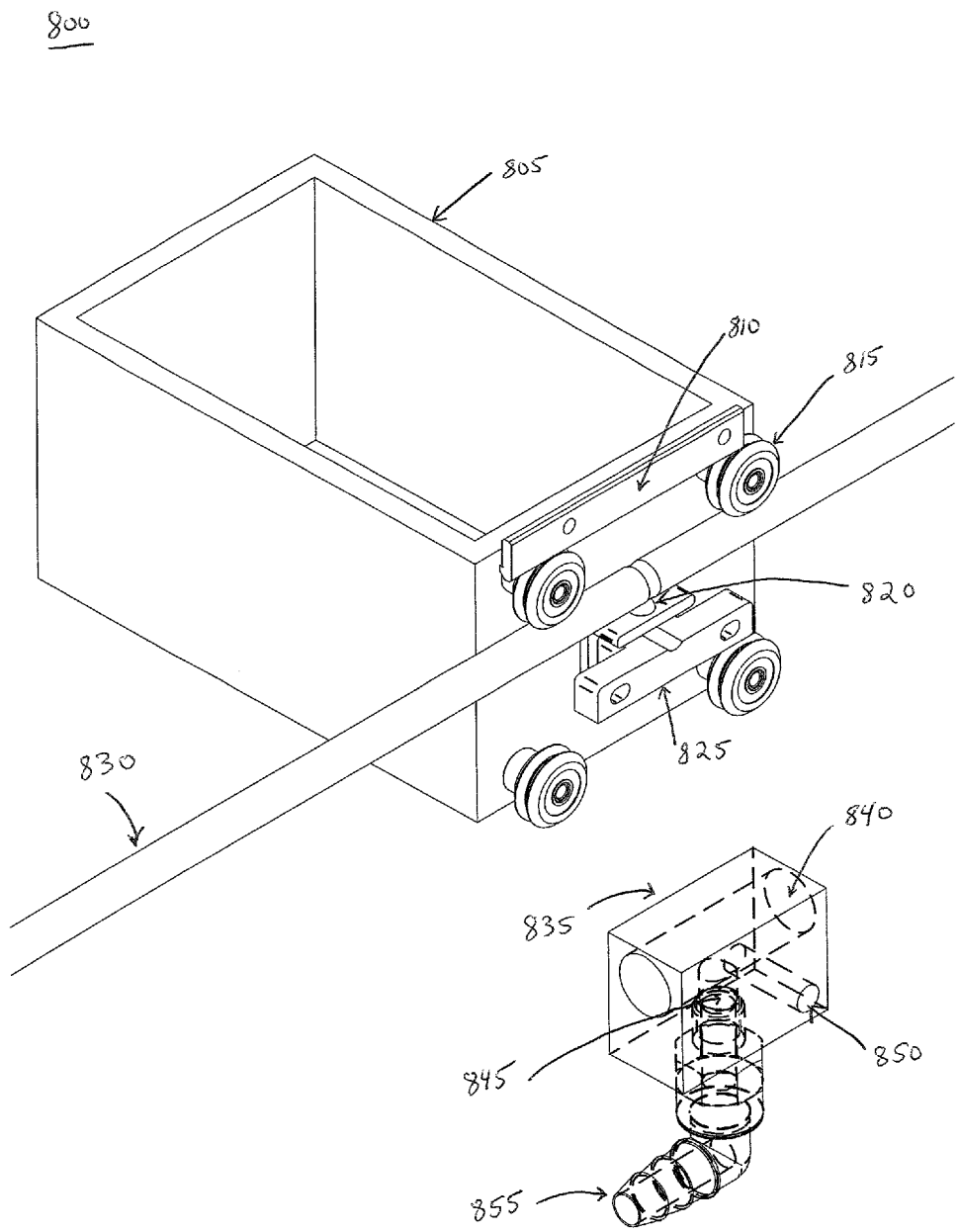
FIG. 8 is a diagram illustrating an assembly for a belt and bearing mechanism configured in accordance with one embodiment of the present invention.

FIG. 8 is a diagram 800 illustrating an assembly for belt and bearing mechanism embodiment. A notched flexible belt passes between the belt support and the ball bearing. By indexing the belt, the ball bearing will engage or disengage the pull rod. Another embodiment uses air pressure to force the ball bearing to engage the pull rod. Components comprise drawer 805, guide rail 810, rollers 815, ball bearing 820, belt support 825, pull rod 830, housing 835, opening for pull rod 840, ball bearing seat 845, mounting hole 850, and air fitting 855.

Figure 9:
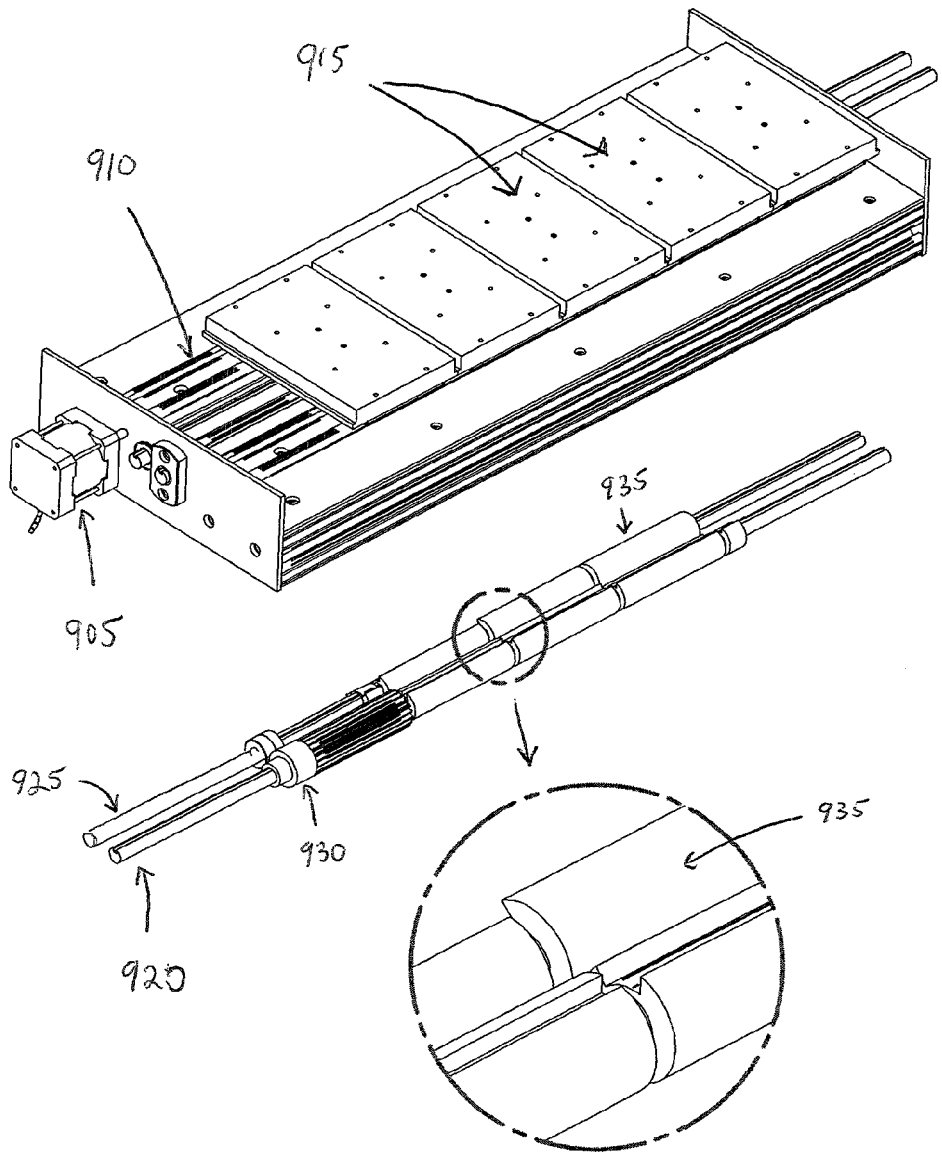
FIG. 9 is a diagram illustrating a segmented platform for five positions configured in accordance with one embodiment of the present invention.

FIG. 9 is a diagram 900 illustrating a segmented platform embodiment for five positions. Two rods are geared to move in opposite directions. They have segments that engage or disengage pins connected to the pallets. Rotating the rods selects which pallets are locked and which are free to move with the pull rod. Components comprise stepper motor 905, guide rails 910, pallets 915, pull rod 920, turning rod 925, gears 930, and segments 935.

Figure 10:
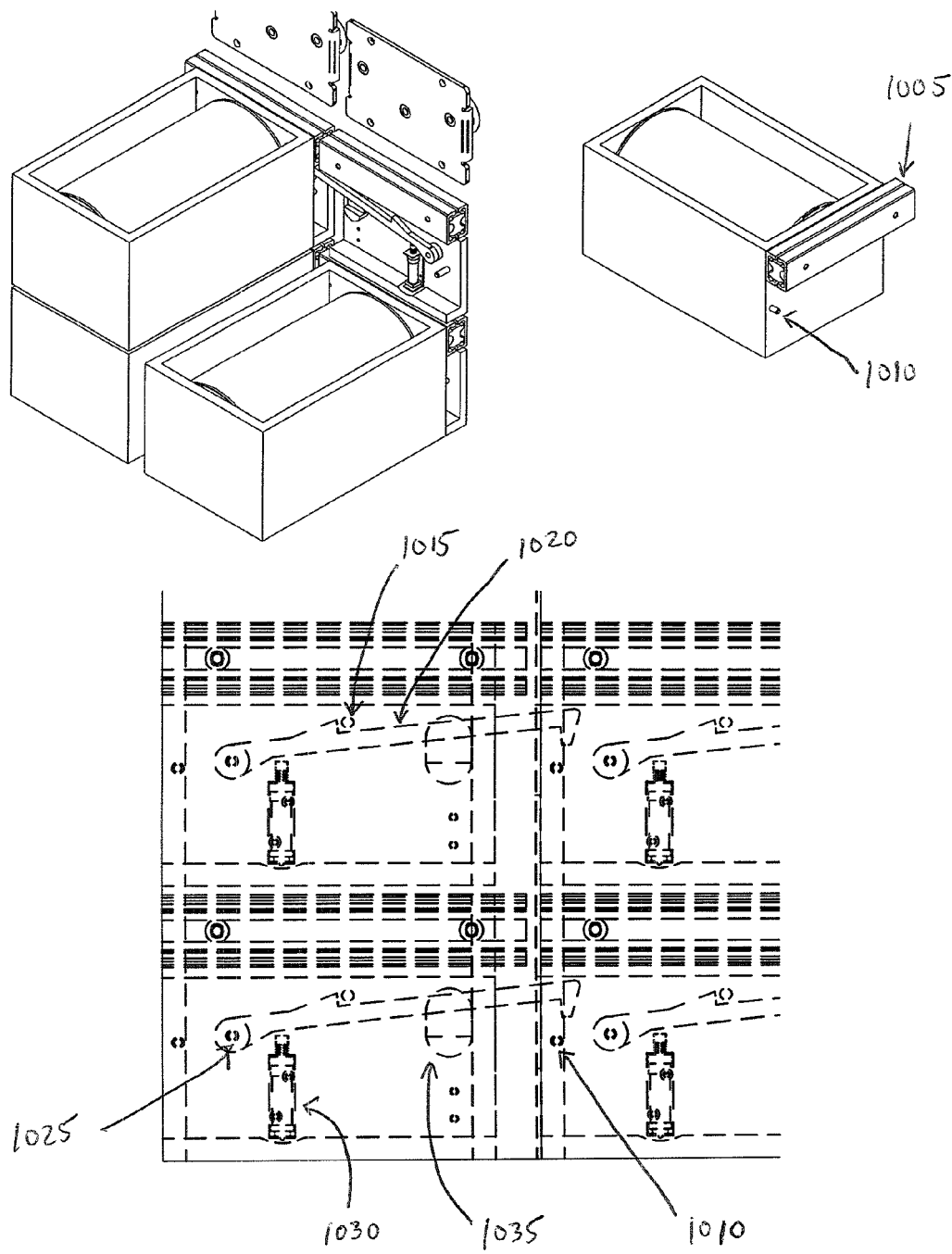
FIG. 10 is a diagram illustrating a latch assembly, two units, configured in accordance with one embodiment of the present invention.

FIG. 10 is a diagram 1000 illustrating a latch assembly embodiment, two units. Components comprise extension slide 1005, pulling pin 1010, locking pin 1015, latching lever 1020, pivot 1025, solenoid 1030, and lever stop 1035.

Figure 11:
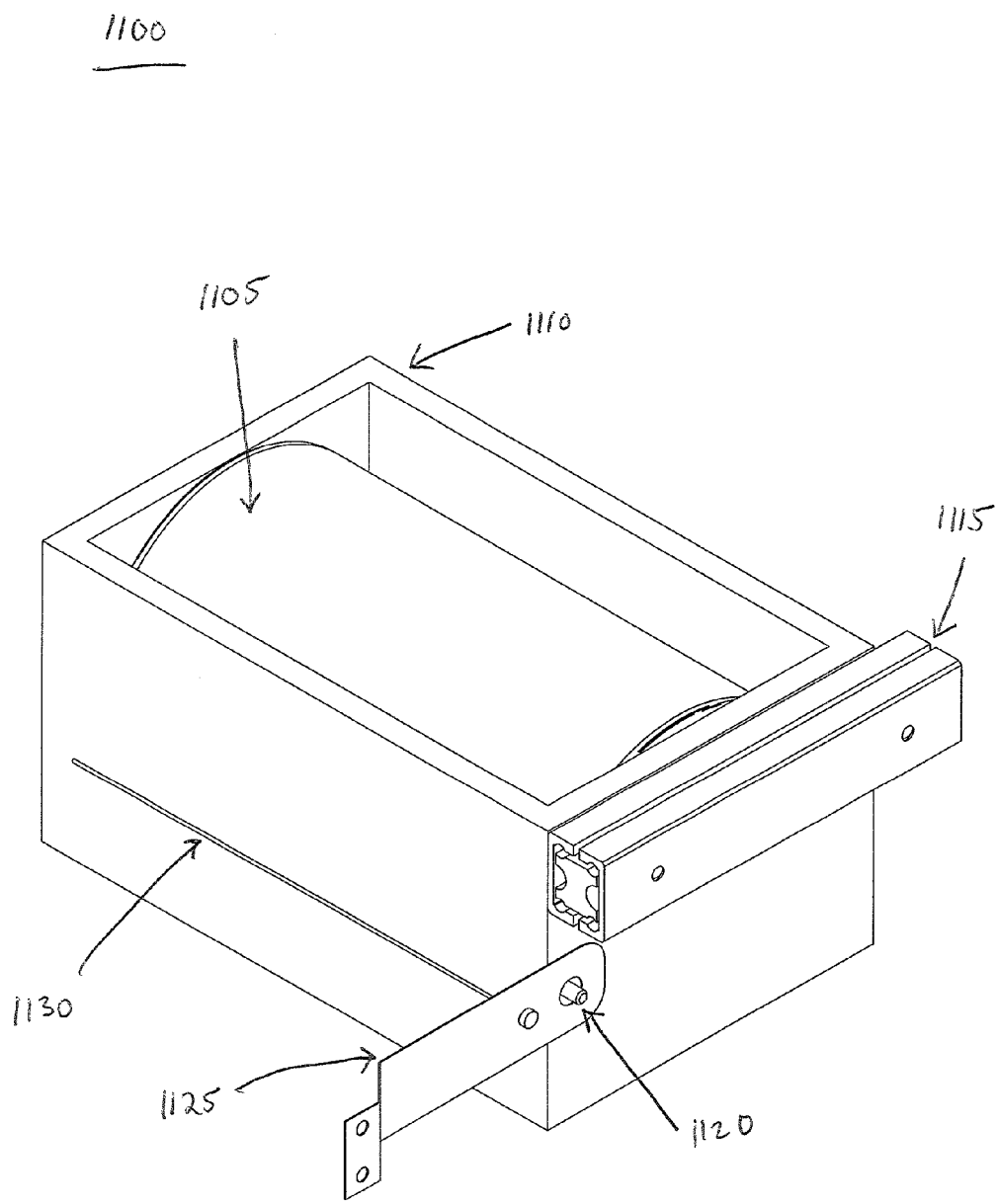
FIG. 11 is a diagram illustrating a muscle wire and spring latch drawer with an extension slide configured in accordance with one embodiment of the present invention.

FIG. 11 is a diagram 1100 illustrating a muscle wire and spring latch drawer with extension slide embodiment. The muscle wire and spring steel latch are attached to the forward panel (not shown). When the muscle wire is activated, the spring latch is pulled over the pulling pin which will pull the drawer when the forward panel/slice is moved. Deactivating the muscle wire allows the spring latch to disconnect from the pin. Components comprise container 1105, drawer 1110, extension slide 1115, pulling pin 1120, spring steel latch 1125, and muscle wire 1130.

Figure 12:
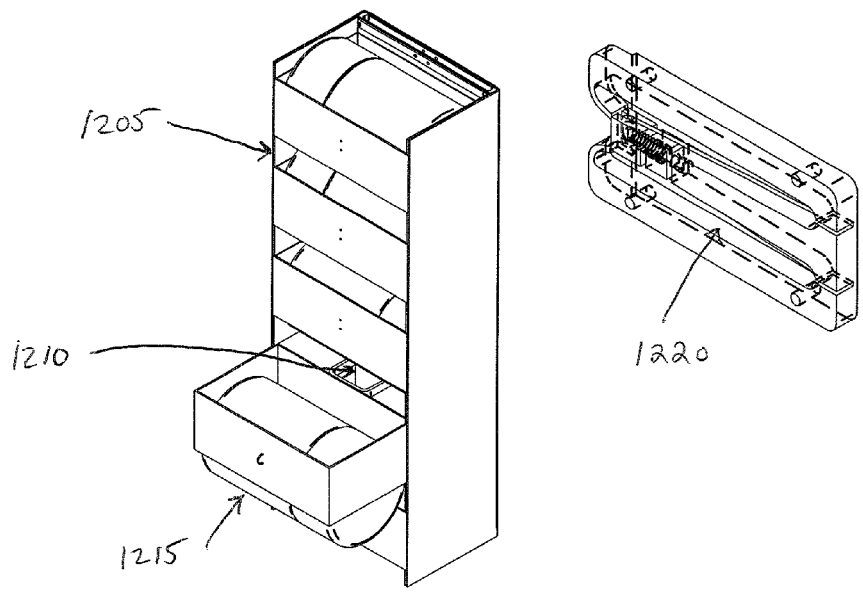
FIG. 12 is a diagram illustrating a muscle wire assembly configured in accordance with one embodiment of the present invention.
Figure 12:
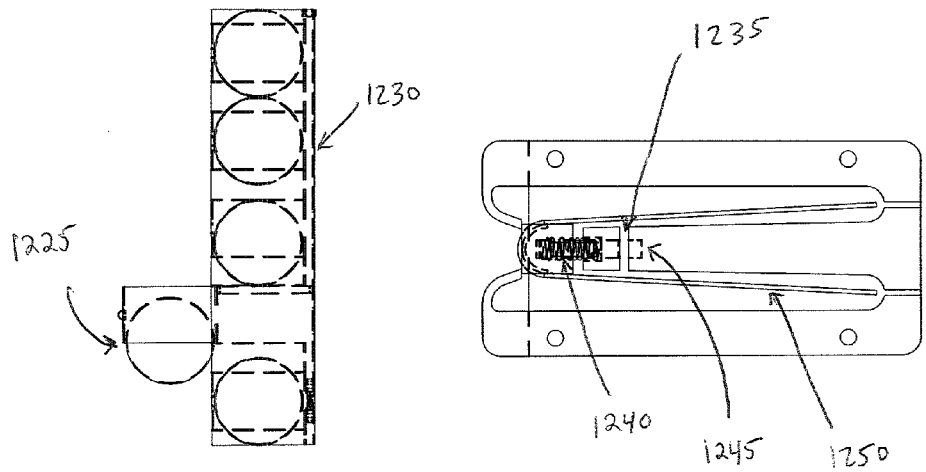

FIG. 12 is a diagram 1200 illustrating a muscle wire assembly embodiment. Components comprise drawers that slide on supports affixed to the side walls 1205, a flexible support that is pulled forward with drawer and prevents above canisters from falling behind drawer 1210, and canister 1215. Displayed surface mounts to the inside of the back wall so that it can engage the wire pull loop from a trailing drawer that extends thru a slot in the wall 1220, wire pull loop 1225, back wall 1230, gap for pull loop 1235, spring 1240, pin 1245, and muscle wire 1250.

Figure 13:
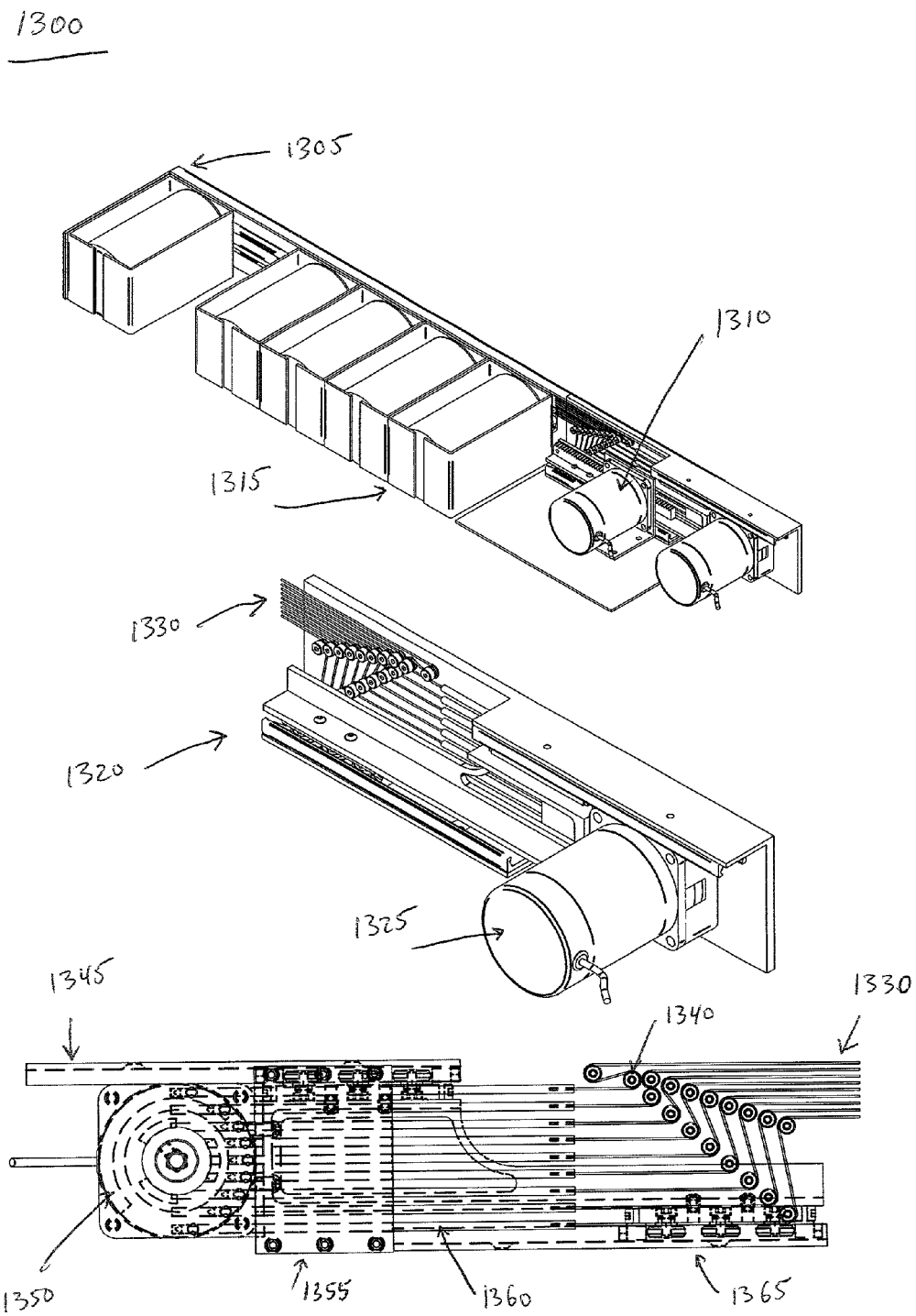
FIG. 13 is a diagram illustrating a pull wire and index disk configured in accordance with one embodiment of the present invention.

FIG. 13 is a diagram 1300 illustrating a row assembly embodiment. This design is an alternative embodiment method of moving drawers by engaging and disengaging pull wires. It uses a stepper motor to index a disc that forces ball bearings to capture rods with pull wires attached. The entire engagement assembly is then moved on guide rails by another stepper motor which causes the appropriate drawers to move. The first drawer is attached to the engagement assembly in such a way that it provides the force to return all the drawers to the home position. Components comprise a home position 1305, stepper motor moving engagement assembly 1310, first drawer 1315, engagement assembly 1320, stepper motor operating disk 1325, pull wires 1330, pulleys 1340, upper guide rail 1345, disc 1350, pull rod guide block 1355, pull rods 1360, and lower guide rail 1365.

Figure 14:
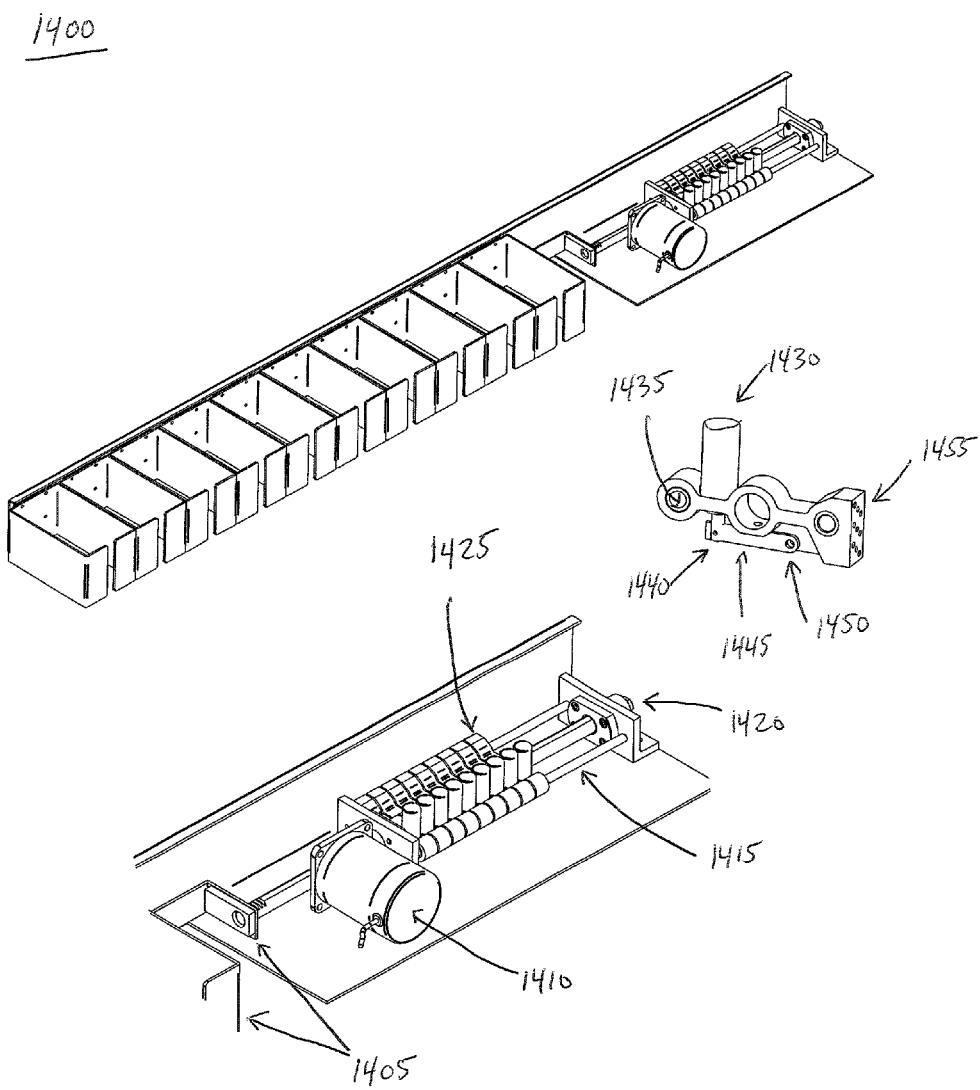
FIG. 14 is a diagram illustrating a solenoid assembly, nine solenoids ten drawer units, configured in accordance with one embodiment of the present invention.

FIG. 14 is a diagram 1400 illustrating a nine solenoid assembly embodiment with ten drawer units. Drawers are fixed to a solenoid assembly by a single wire. The first drawer is fixed and does not require a solenoid. The solenoid assembly is engaged or disengaged with the pull rod by the action of the solenoid. The pull rod is driven by the stepper motor and guided by bushings. Components comprise a first drawer (attached to a pull rod) that provides the pushing force to return all drawers to the home position 1405. Components further comprise stepping motor geared to pull rod 1410, guide rods 1415, pull rod 1420, solenoid assembly 1425, solenoid 1430, bushing 1435, ball bearing (not shown) 1440, lever 1445, pivot 1450, and pull wire attachment points 1455.

Figure 15:
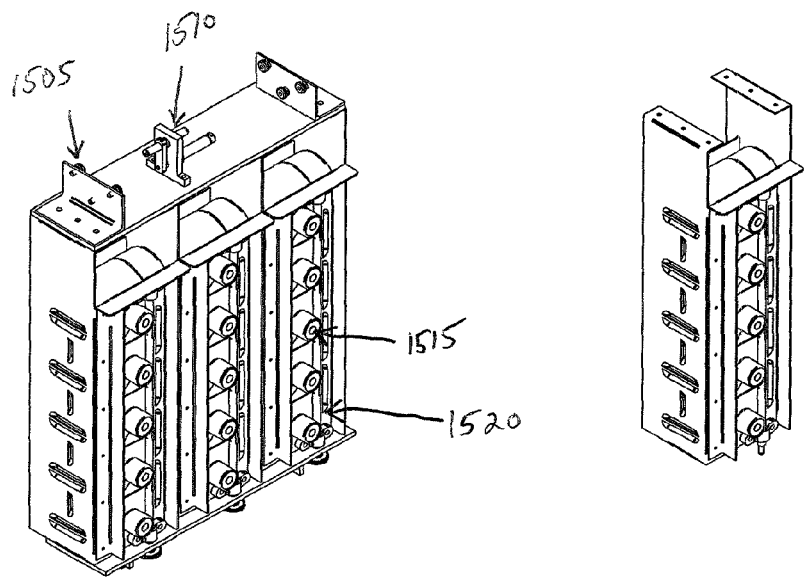
FIG. 15 is a diagram illustrating individual container unit assemblies (ICUs) configured in accordance with one embodiment of the present invention.
Figure 15:
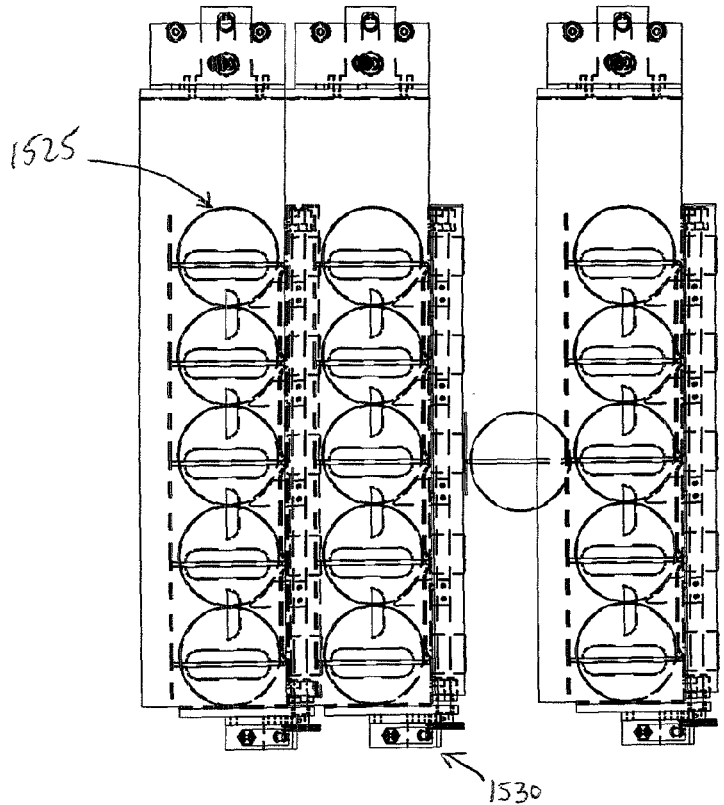

FIG. 15 is a diagram 1500 illustrating individual container unit assembly embodiments. It depicts between-slice gap formed by movement of slice. Components comprise guide rollers 1505, engagement pin 1510, electromagnets 1515, stop lever rod 1520, container 1525, and rack & pinion 1530 to operate stop lever rod.

Figure 16:
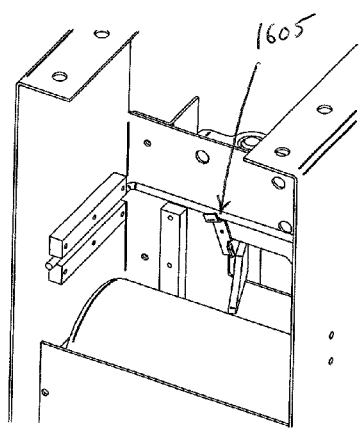
FIG. 16 is a diagram illustrating detail of FIG. 15 configured in accordance with one embodiment of the present invention.
Figure 16:
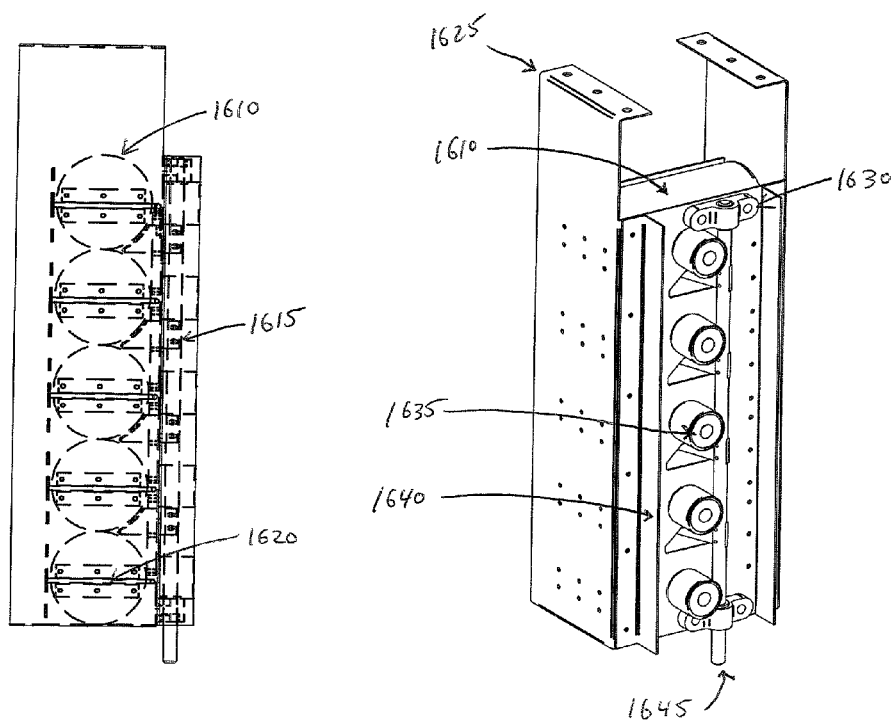

FIG. 16 is a diagram 1600 illustrating detail of a five unit assembly of FIG. 15. Components comprise drawer retaining clip 1605, container 1610, stop lever 1615, drawer wire guides 1620, frame 1625, bearing 1630, electromagnet 1635, spacer 1640, and stop lever rod 1645.

Figure 17:
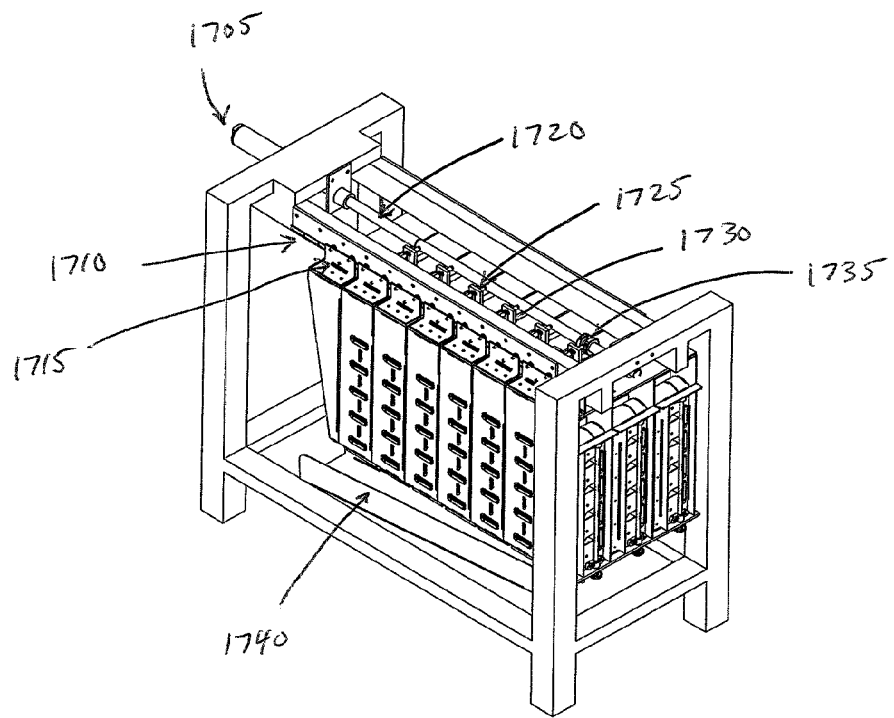
FIG. 17 is a diagram illustrating a medium individual container unit assembly configured in accordance with one embodiment of the present invention.
Figure 17:
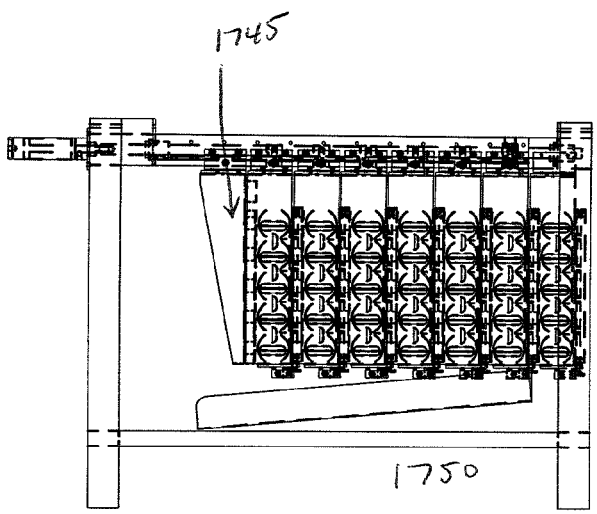

FIG. 17 is a diagram 1700 illustrating a medium individual container unit assembly embodiment. Components comprise air cylinder 1705, guide rail 1710, roller bearings 1715, pull rod 1720, air cylinder 1725, engagement pin 1730, latching collar 1735, drop chute 1740, for embodiments, front panel contains only electromagnets 1745. Side view depicts home position 1750.

Figure 18:
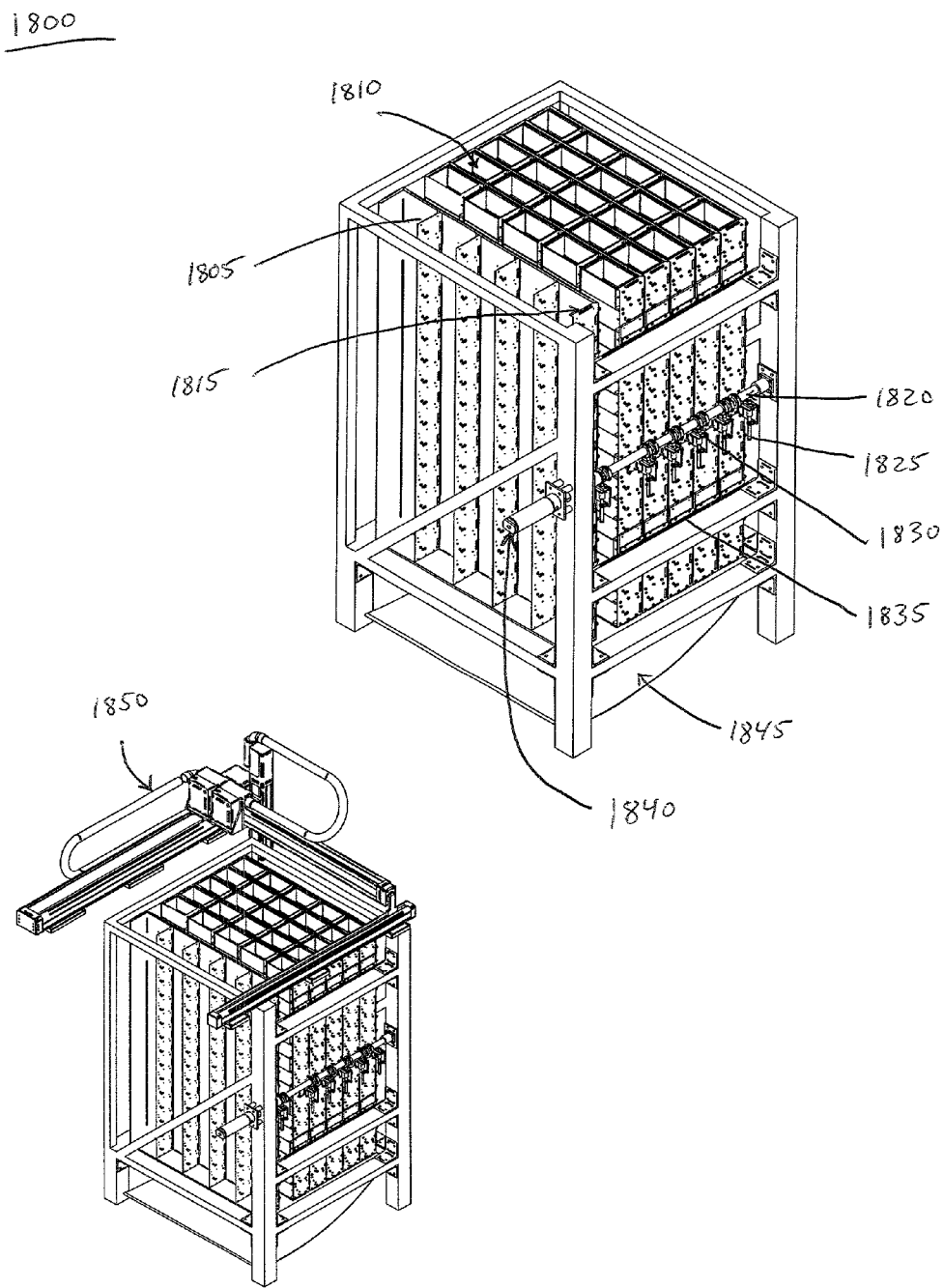
FIG. 18 is a diagram depicting Large Panel assemblies configured in accordance with one embodiment of the present invention.

FIG. 18 is a diagram 1800 illustrating Large Panel assembly embodiments. Components comprise panel 1805, drawer 1810, latching assembly 1815, pull rod 1820, air cylinder 1825, engagement pin 1830, roller bearing 1835, air cylinder 1840, drop chute 1845, and gantry robot for placing containers in drawers 1850.

Figure 19:
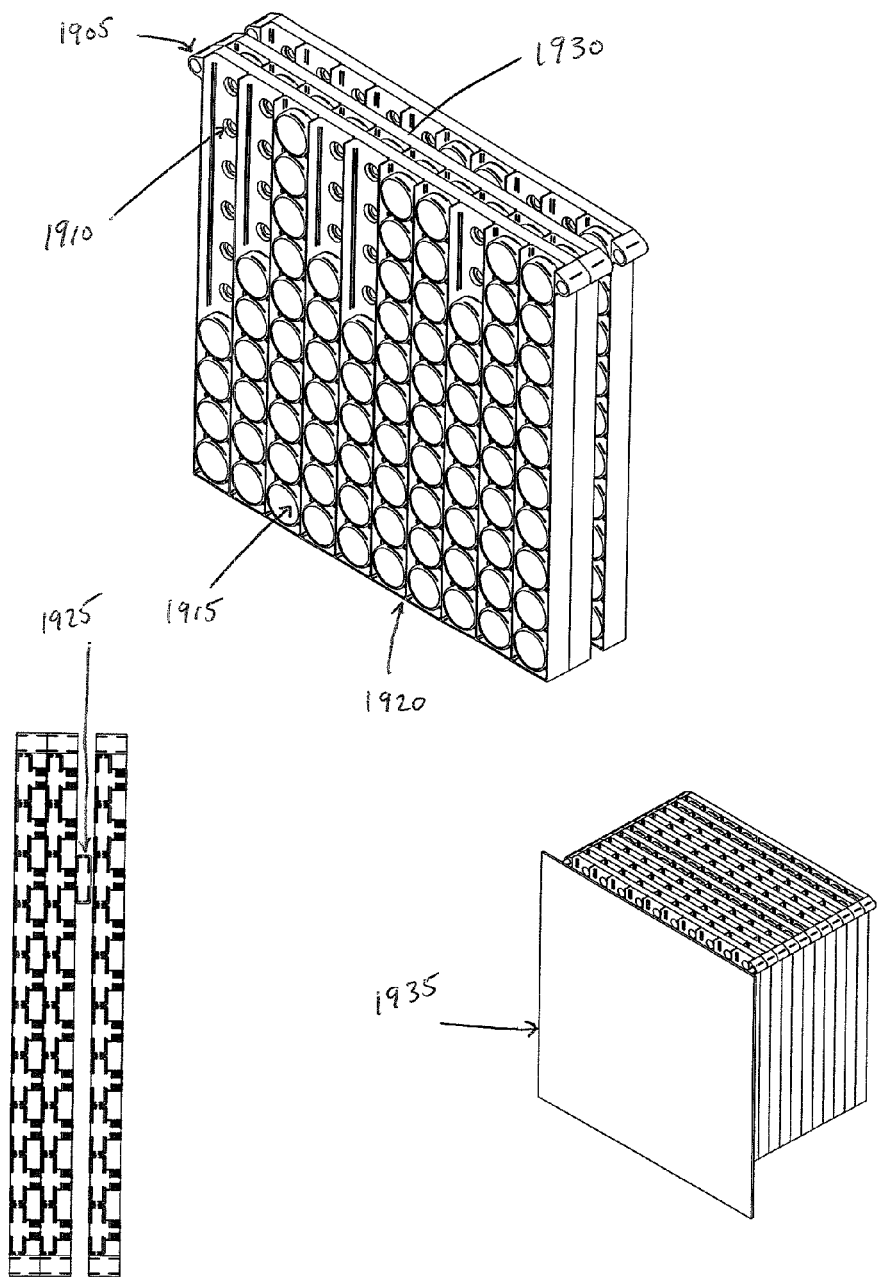
FIG. 19 is a perspective diagram illustrating a magnetic dispenser slice with pill containers, 1,000 pieces, configured in accordance with one embodiment of the present invention.

FIG. 19 includes a perspective diagram 1900 illustrating a magnetic dispenser slice with pill containers, 1,000 pieces. To vend, all the magnetic coils on a slice are activated except the one for the container to be dispensed. The coil directly in front of the container to be dispensed is activated. This is done so that when the slices 1920 move apart, only the container to be dispensed will slide into the void, where it is released by the coil in front and allow to fall free. Components comprise guide bushing 1905, magnetic coils 1910, magnetic containers 1915, molded slice 1920, and container to dispense 1925. Containers are loaded from the top and free-fall into place 1930. Multiple slices are adjacently aligned in an array 1935.

Figure 20A:
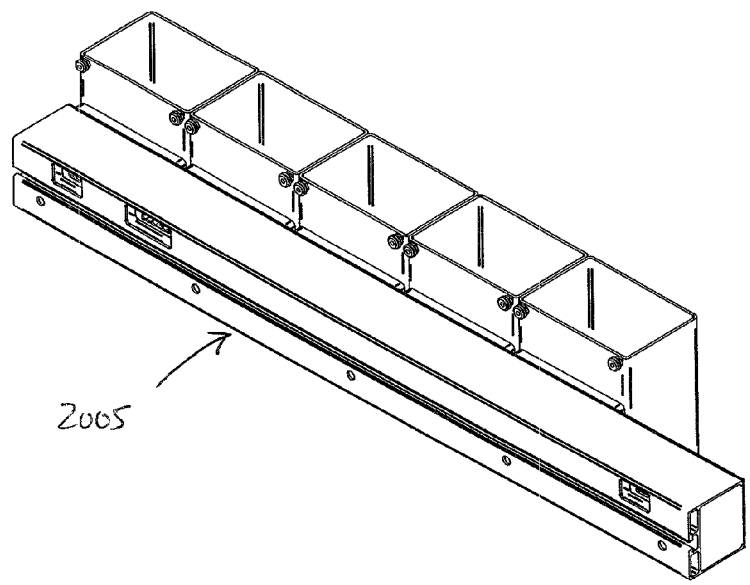
FIG. 20A is a diagram illustrating a linear motor configuration with square drawers according to an embodiment of the invention.
Figure 20A:
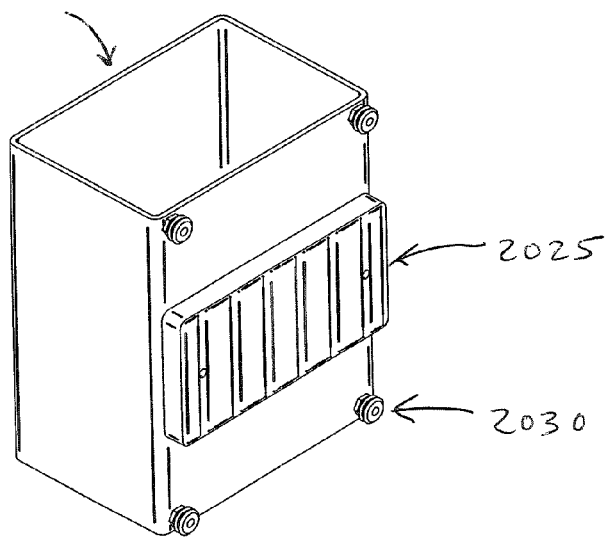

FIG. 20A is a diagram illustrating a linear motor configuration with square drawers according to an embodiment of the invention. The linear motor may be a QUICK STICK®. QUICK STICK® is a registered trademark of MagneMotion, Inc. of Devens, Mass. Components comprise MagneMotion QUICK STICK® 2005, drawer 2020, magnet array 2025 and roller wheels 2030. Other suitable devices similar in function to the QUICKSTICK® may be used. Drawer motion is effected by activation of the electromagnetic components.

Figure 20B:
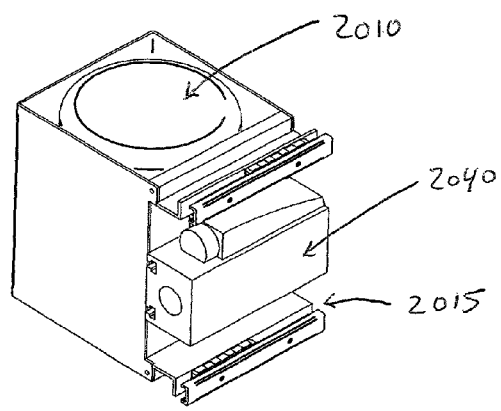
FIG. 20B is a diagram illustrating an alternative linear motor configuration with square drawers according to an embodiment of the invention.
Figure 20B:
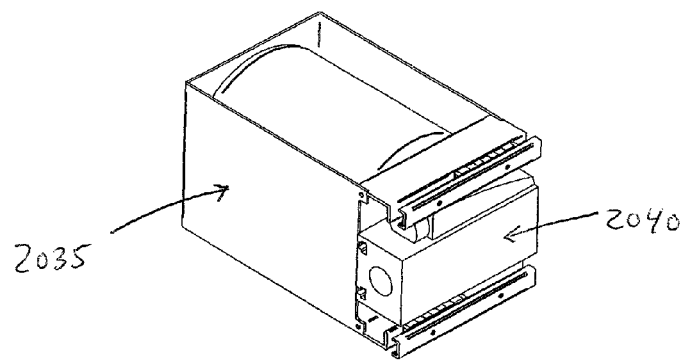

FIG. 20B is a diagram illustrating an alternative linear motor configuration with square drawers according to an embodiment of the invention. Components comprise container 2010, roller bearings 2015, drawer 2035, and linear motor 2040. The linear motor may be a ServoTube™ linear motor as manufactured by Copley Controls of Canton, Mass. Drawer motion is effected by activation of the electromagnetic components.

Figure 21:
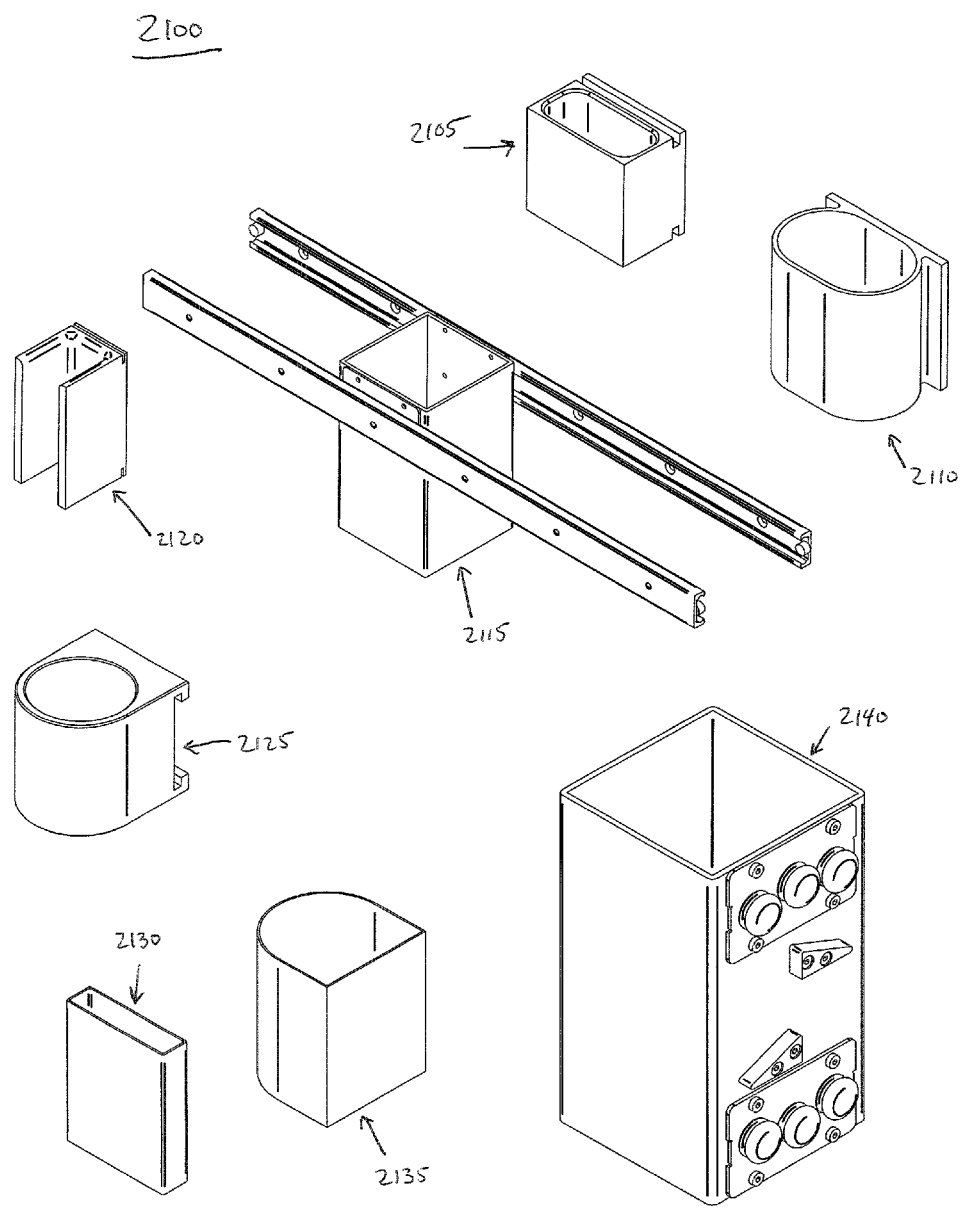
FIG. 21 is a diagram illustrating PVC square tube with rails configurations in accordance with one embodiment of the present invention.

FIG. 21 is a diagram 2100 illustrating drawer style embodiments comprising PVC square tube with rails. Drawer embodiments 2105-2140 can be designed in virtually any shape or size as long as they allow an appropriate container or item to pass. Drawer embodiments can be open ended or closed. Drawer embodiments move on guide rails and are supported by attached rollers all on one side or opposing sides. In embodiments, slides or rollers are incorporated in the design of the Drawer.

Figure 22:
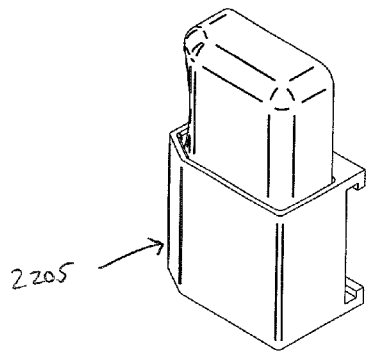
FIG. 22 is a diagram illustrating a thermoformed pill carrier configured in accordance with one embodiment of the present invention.
Figure 22:
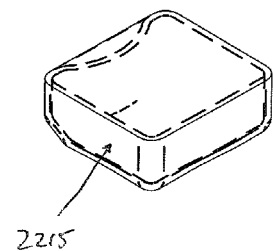
Figure 22:
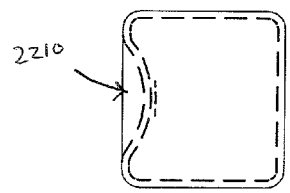
Figure 22:
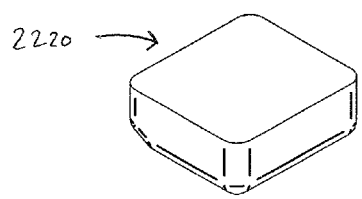
Figure 22:
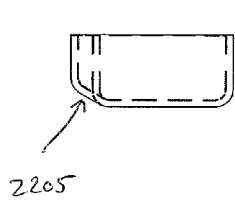

FIG. 22 is a diagram illustrating thermoformed pill carrier embodiments 2200. Components comprise an angled feature 2205 so container enters drawers in correct orientation, and indent 2210 allowing easy opening. Carrier embodiment bodies comprise clear thermoformed plastic 2215 and foil lid 2220.

Figure 23:
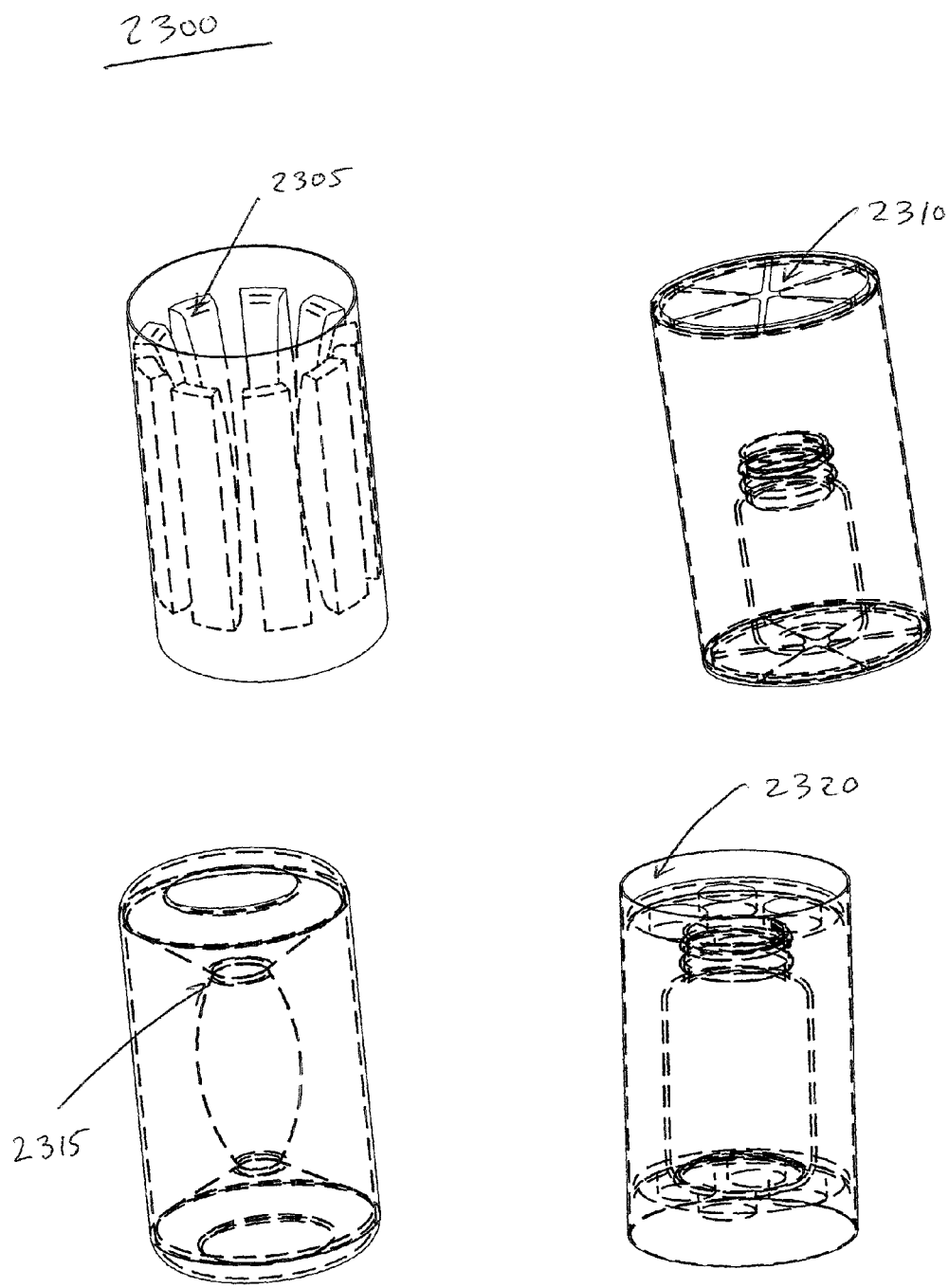
FIG. 23 is a diagram illustrating clear carrier containers configured in accordance with one embodiment of the present invention.

FIG. 23 is a diagram 2300 illustrating clear carrier with drug container embodiments. Components comprise foam lining that captures product and holds it by friction 2305, flexible end caps allowing product to be pushed in or out 2310, restricting bands through which product is forced and held in place by flexible membrane 2315, and end caps friction-fit and collapsed to hold product 2320.

Figure 24:
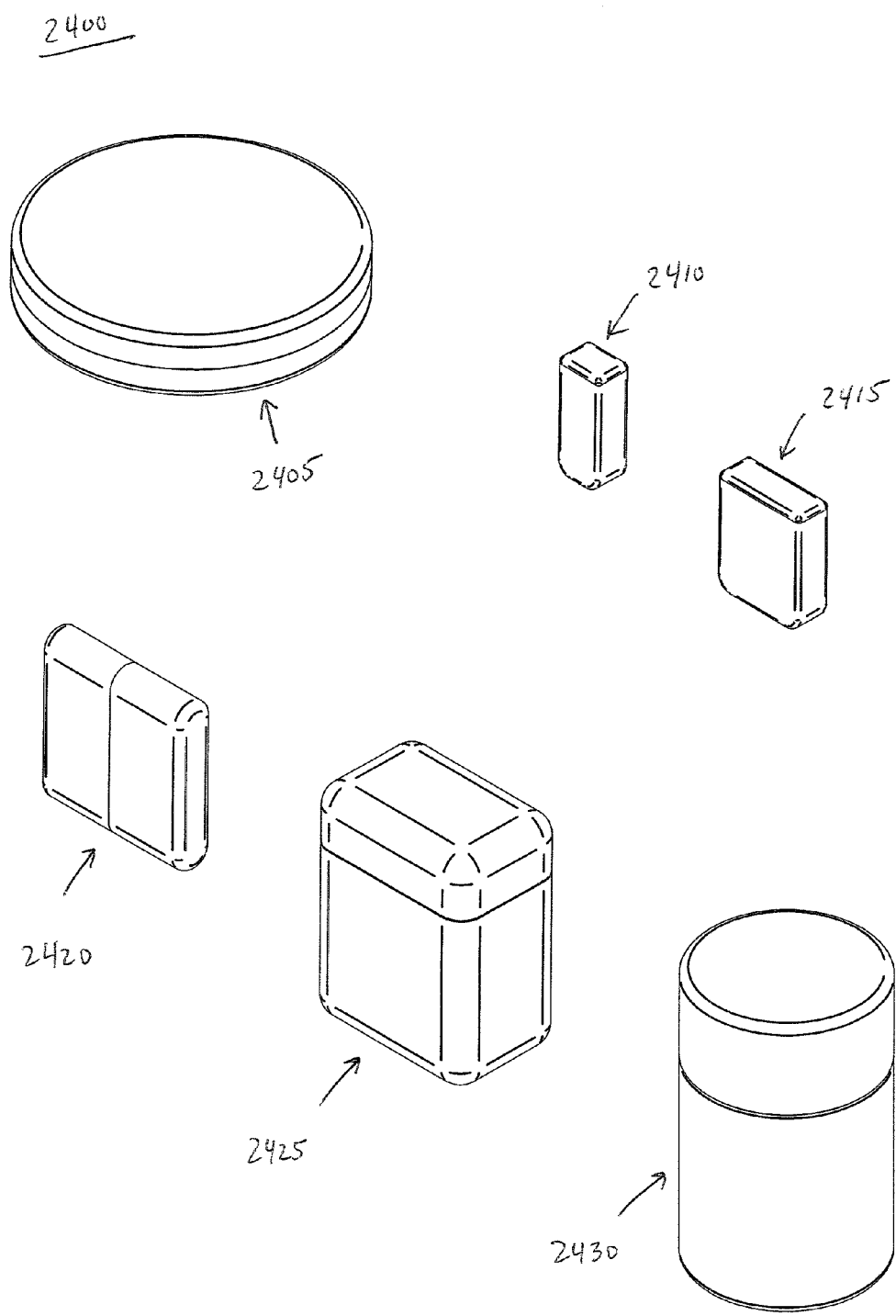
FIG. 24 is a diagram illustrating canisters configured in accordance with one embodiment of the present invention.

FIG. 24 is a diagram 2400 illustrating container or canister embodiments 2405-2430. Containers can be virtually any shape or size provided they fit within the appropriate drawer. For embodiments, edges are rounded to pass freely and not bind between drawers.

Containers by nonlimiting example can be configured to operate in pneumatic tube systems, provide anti-microbial protection, and include RFID tracking components.

Figure 25:
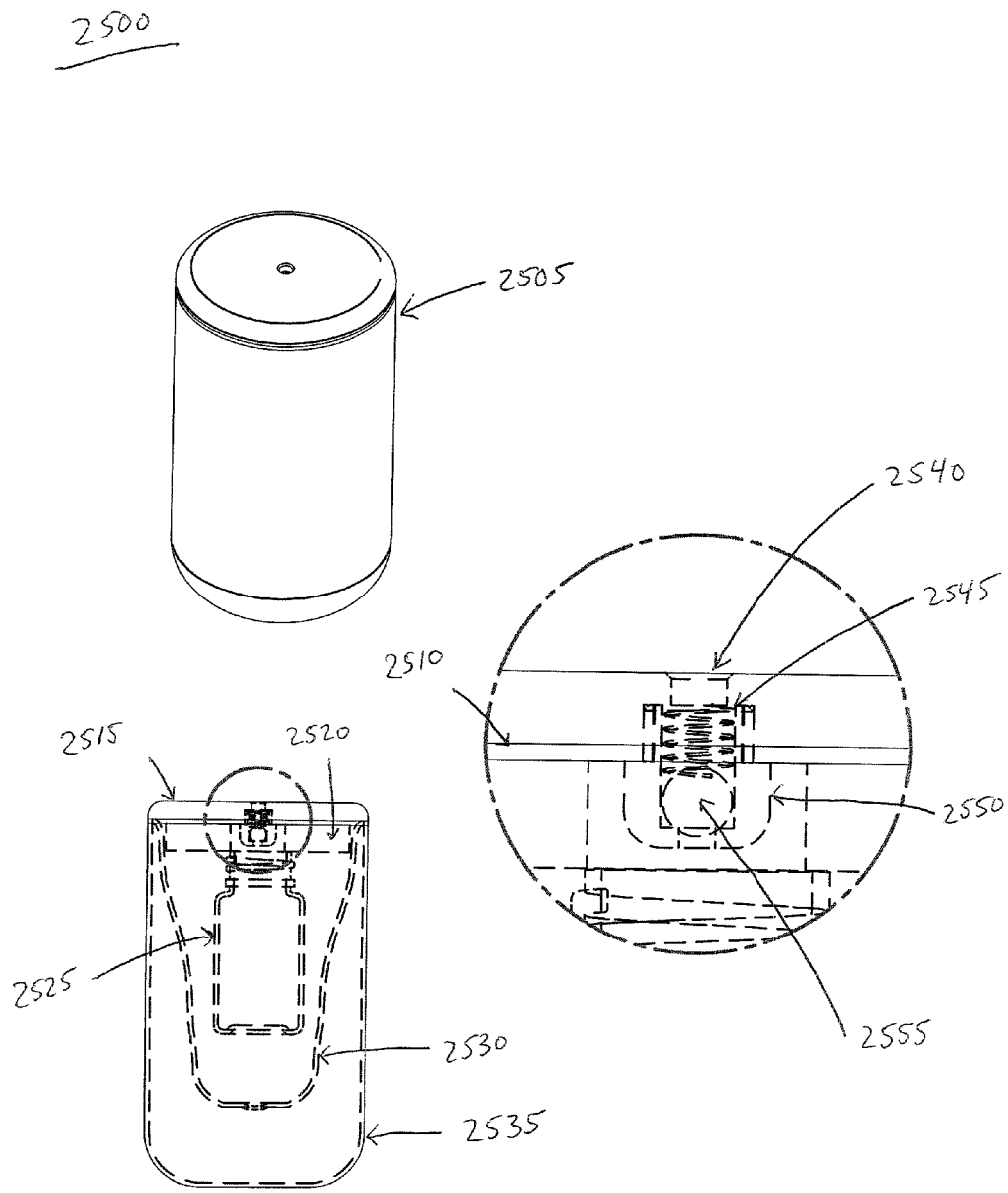
FIG. 25 is a diagram illustrating a container with vacuum seal assembly configured in accordance with one embodiment of the present invention.

FIG. 25 is a diagram 2500 illustrating a container with vacuum seal assembly 2505. When air is withdrawn through the valve, the flexible liner collapses, drawing the bottle tight against the foam cushioning. The vacuum also pulls the cap tight to the liner that is attached to the container. Everything stays connected until the valve is released. Components comprise flexible liner sealed to container 2510, cap 2515, foam cushion 2520, bottle 2525, flexible liner 2530, container 2535, air vent 2540, valve spring 2545, valve housing 2550, and ball bearing 2555. For embodiments, padding can be inserted and loose items accommodated.

Embodiment aspects include temperature and or force consideration, time tracking, and real-time inventory support. Drawers may directly contain items including nonlimiting examples such as shoe boxes, cigarettes, aspirin, and beverage cans. Dispenser embodiments may be scaled to house very large items. Embodiments can support easy retrieval and easy re-stocking of empty locations. One content example is bicycles.

Figure 26:
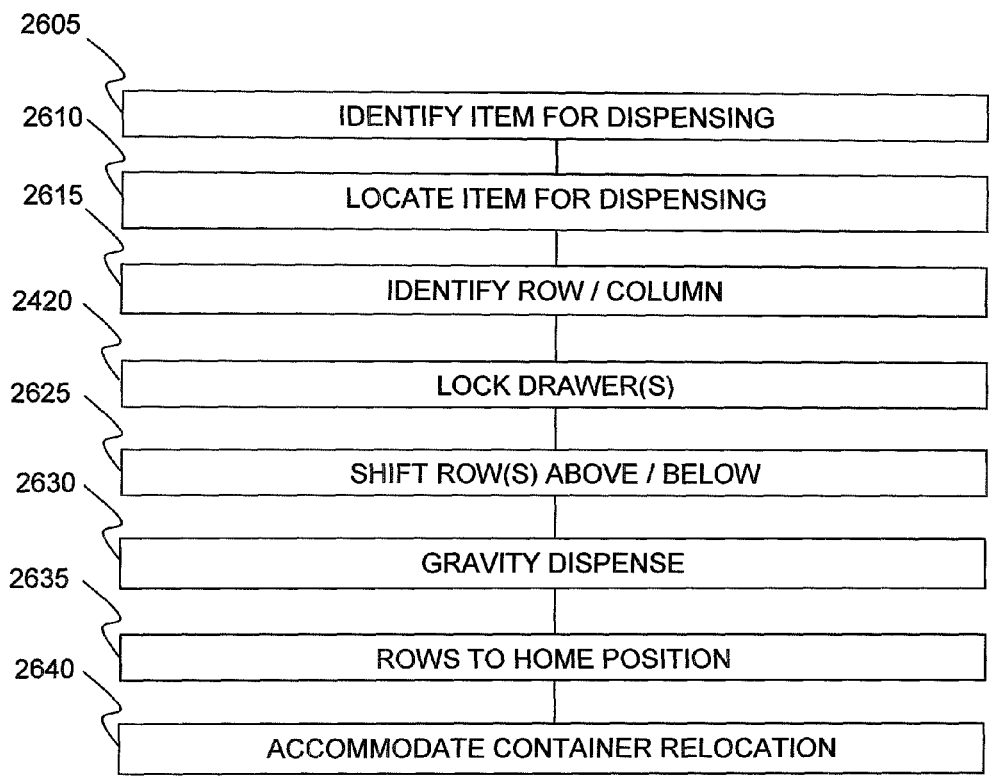
FIG. 26 is a flow chart of a method of dispensing items configured in accordance with one embodiment of the present invention.

FIG. 26 is a flow chart of a method 2600 of dispensing items. Steps comprise identifying an item for dispensing 2605, locating the item in the dispenser 2610, identifying the row and column of the location of the item 2615, locking at least one drawer in at least one column based on the location of the drawer 2620, shifting the drawers 2625, whereby the item is removed from its drawer by non-contact force 2630, returning drawers to home position as required 2635, and accounting for container relocation as required 2640. Soft drop embodiments comprise row-by-row displacement during dispensing so that the item transfers in row increments. The item drops a portion of the full height, incrementally in at least two steps, reducing impact forces on the item. In embodiments, drag fingers, or a similar feature, extend from the sides of containers to slow an item as it falls. Non-dispensing steps can use the same methodology to transfer items from upper to lower rows, reducing or eliminating empty drawers/containers beneath occupied drawers. Embodiments of the dispenser automatically track the location of items by reading one or more indicia associated with the item. This identification can be accomplished when an item is added to the dispenser with updates calculated as items are transferred from drawers. In some embodiments, item location tracking is accomplished by directly reading indicia of items within each drawer following an item transfer. By nonlimiting example, indicia can be machine readable characters, bar code, RFID or combinations of these. Note that some items can reside directly within drawers, not employing containers.

Additional steps comprise placing an item in a random location within the dispenser, automatically associating the item with the random location after the item is placed in the dispenser, identifying the item for dispensing, and controlling the dispenser to dispense the item upon demand. This can support rapid loading or filling of drawers.

Figure 27:
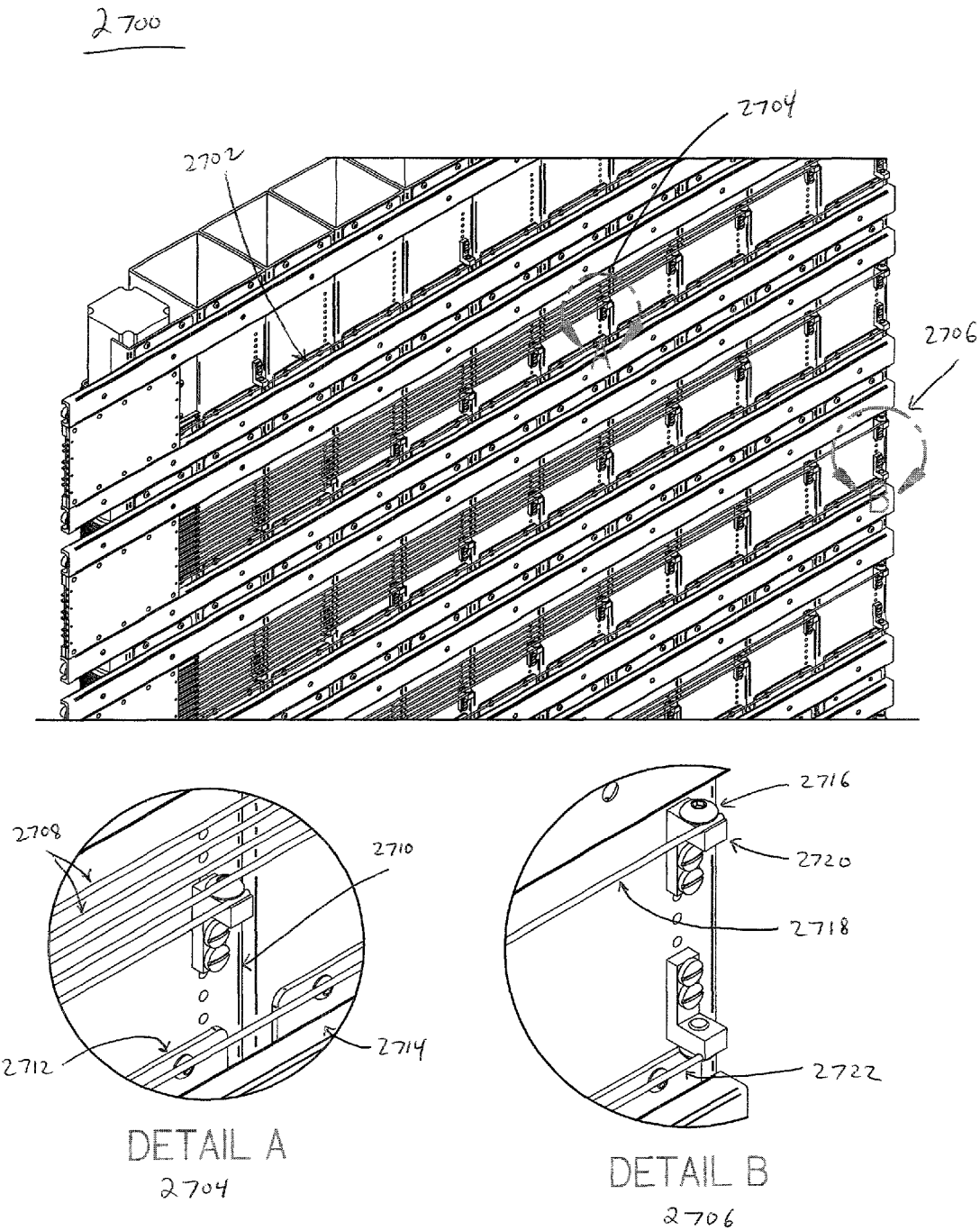
FIG. 27 is a diagram illustrating a configuration of pull wires along the back side of a slice of drawers in accordance with one embodiment of the present invention.

FIG. 27 is a diagram 2700 illustrating a configuration of pull wires along the back side of a slice of drawers mounted on guide rails. The top row of drawers has a single pull wire 2702 attached to the last drawer in the row and to other select drawers for stability. Detail A 2704 illustrates pull wires positioned to move freely 2708, the back side of a drawer 2710, rollers 2712, and guide rail 2714. Detail B 2706, which shows the last drawer in the row, illustrates retaining screw 2716 and bracket 2720 to attach and fasten pull wire 2718. Additionally, the last drawer in the row also has a pull wire 2722 for half travel.

Figure 28:
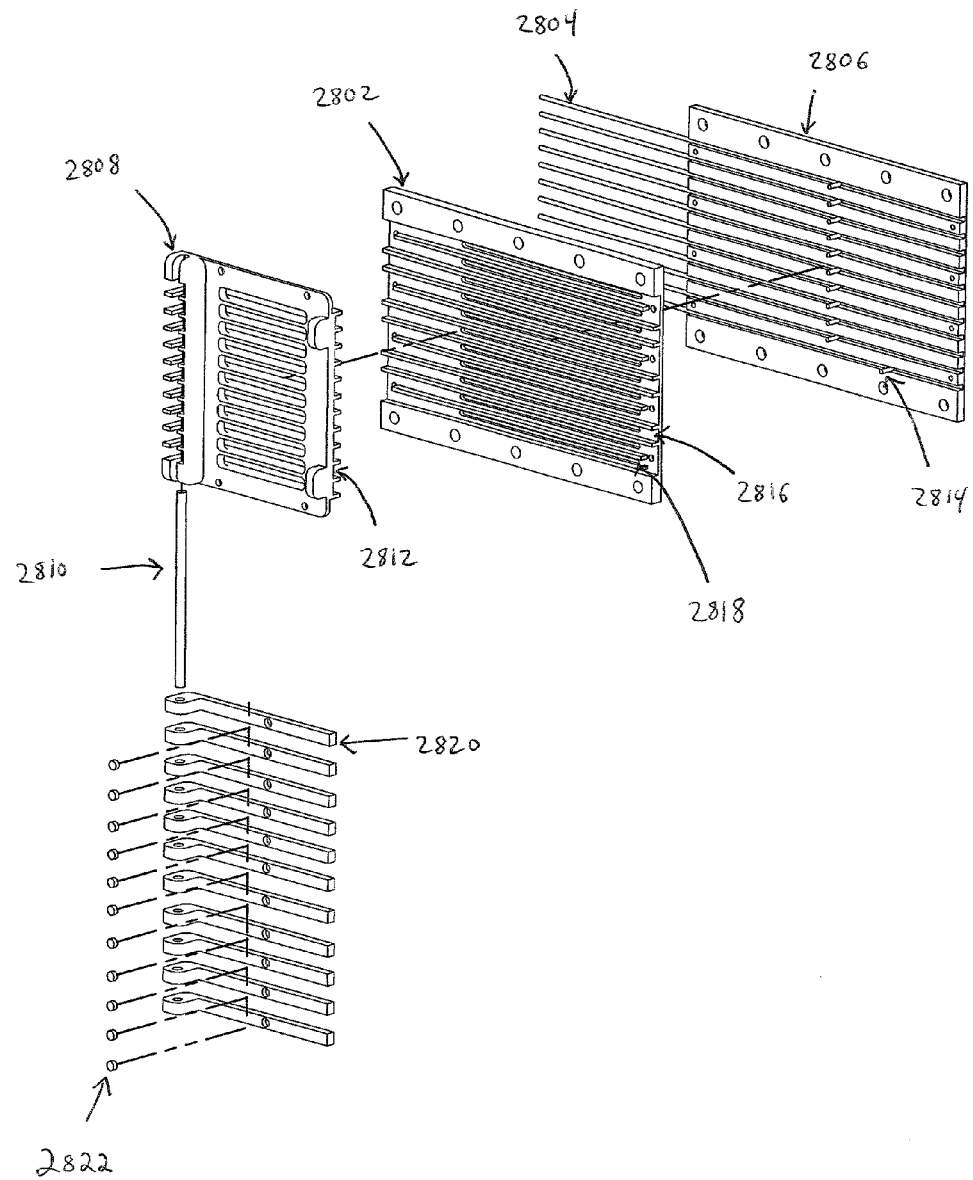
FIG. 28 is a diagram illustrating the supporting structure and assemblies for the pull wires in accordance with one embodiment of the present invention.

FIG. 28 is a diagram 2800 illustrating the supporting structure and assemblies for the pull wires. Pull wires 2804 run between a top guide block 2802 and a bottom guide block 2806. Engagement plate 2808 is deployed over top guide block 2802 so that push arms 2820 can be mounted on pivot wire 2810 running through engagement plate 2808. Magnets 2822 are affixed to each push arm 2820. Channels 2816 are formed in top guide block 2802 to receive push arms 2820 when extended. Pull wires 2804 extend thru slots 2818 in top guide block 2802 to be engaged by push arms 2820. There is a push arm 2820 and pull wire 2804 for each drawer in the row. There is an additional push arm 2820 and pull wire 2814 for the last drawer in the row that is positioned to move the entire row of drawers a half step.

Figure 29:
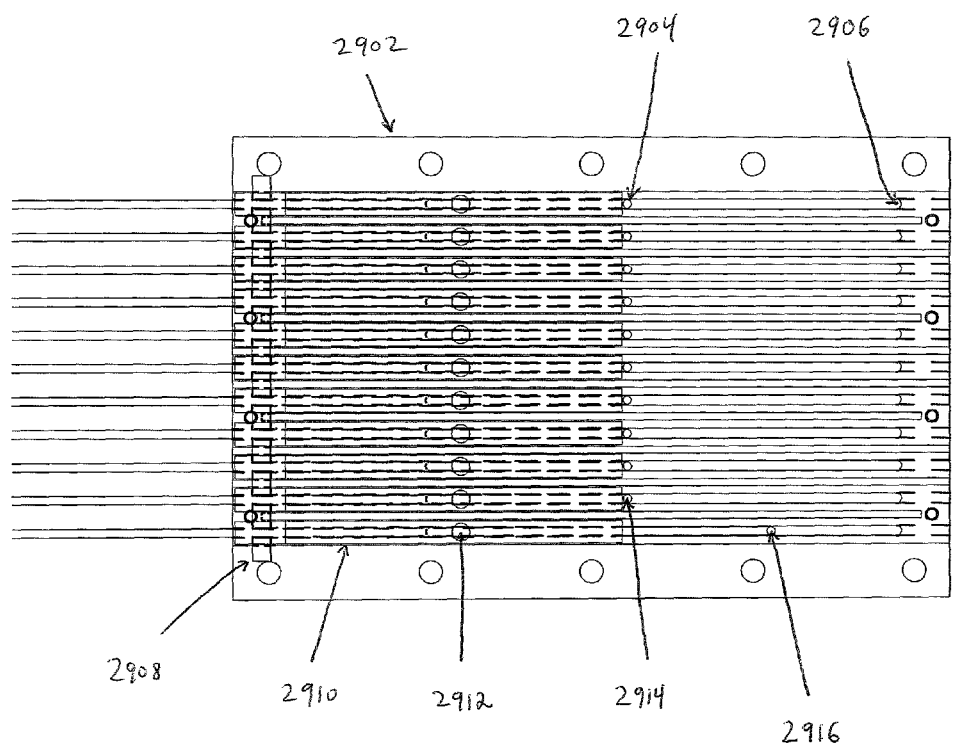
FIG. 29 is a diagram illustrating the front view of a top guide block in accordance with one embodiment of the present invention.

FIG. 29 is a diagram 2900 illustrating the front view of a top guide block. The top guide block 2902 is shown along with the pivot wire 2908, push arms 2910 and magnets 2912. Pull wires 2914 are adjusted for full travel and pull wire 2916 is adjusted for half travel. The beginning point of travel 2904 and end point of travel 2906 are also shown.

Figure 30:
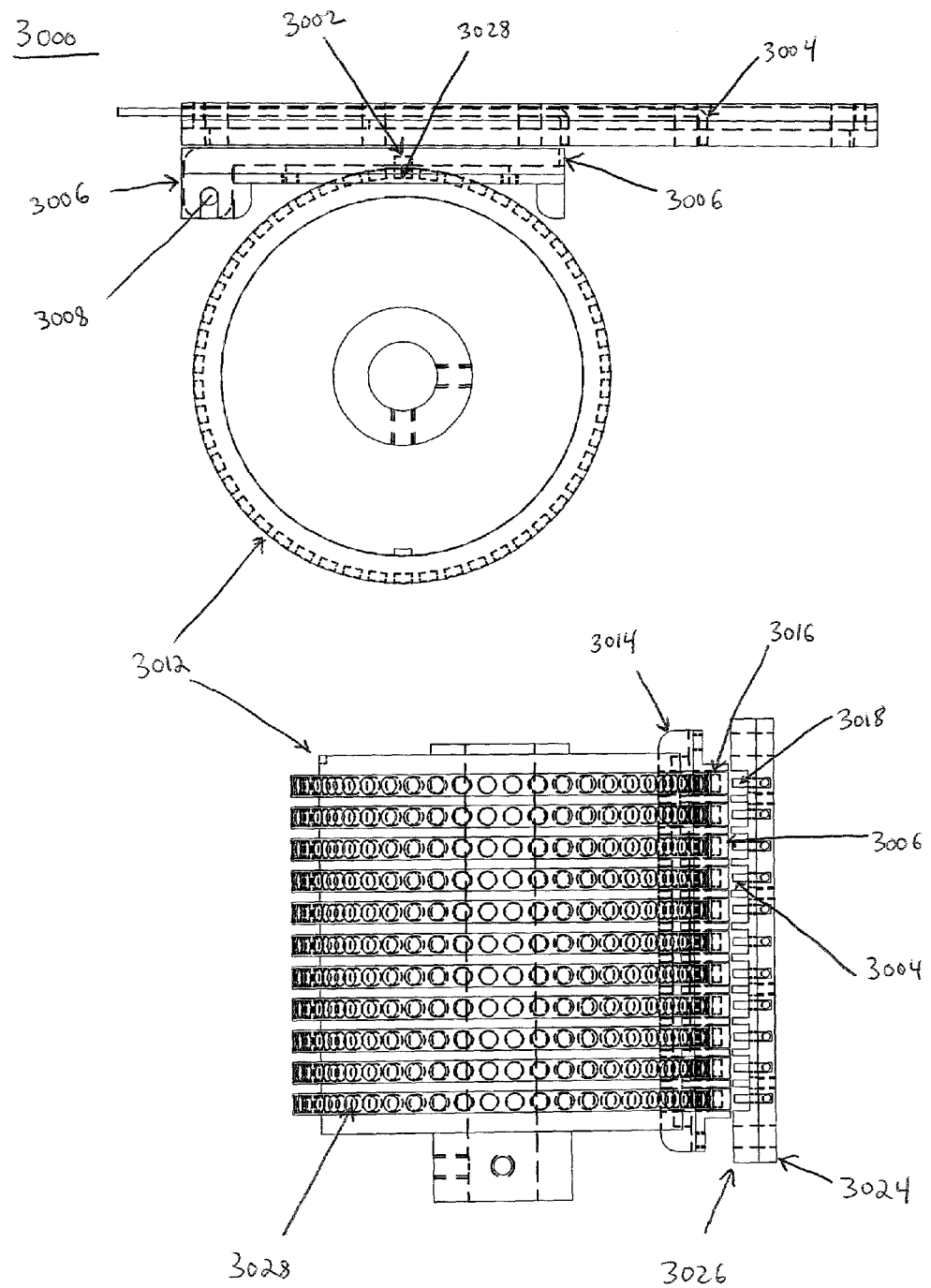
FIG. 30 is a diagram illustrating a top view and side view of the guide blocks and a selector wheel in accordance with one embodiment of the present invention.

FIG. 30 is a diagram 3000 illustrating a top view and side view of the guide blocks and a selector wheel. Bottom guide block 3024, top guide block 3026, engagement plate 3014, push arm 3006 (in attracted position) and pivot wire 3008 are shown. Pull wires 3004 are shown with a 90 degree bend at the termination point of the wire. Selector wheel 3012 is shown with selector wheel magnets 3028 which may align with push arm magnets 3002. When the selector wheel 3012 is indexed, selector wheel magnets 3028 become aligned with push arm magnets 3002 causing the push arms to be either attracted or repulsed depending on the installation orientation of the magnets. When attracted, the push arms 3006 reside in the attracted part of the push arm channel 3016 and remain clear of the pull wires 3004. When repulsed, the push arms 3006 reside in the repulsed part of the push arm channel 3018 and contact the pull wires 3004.

Figure 31:
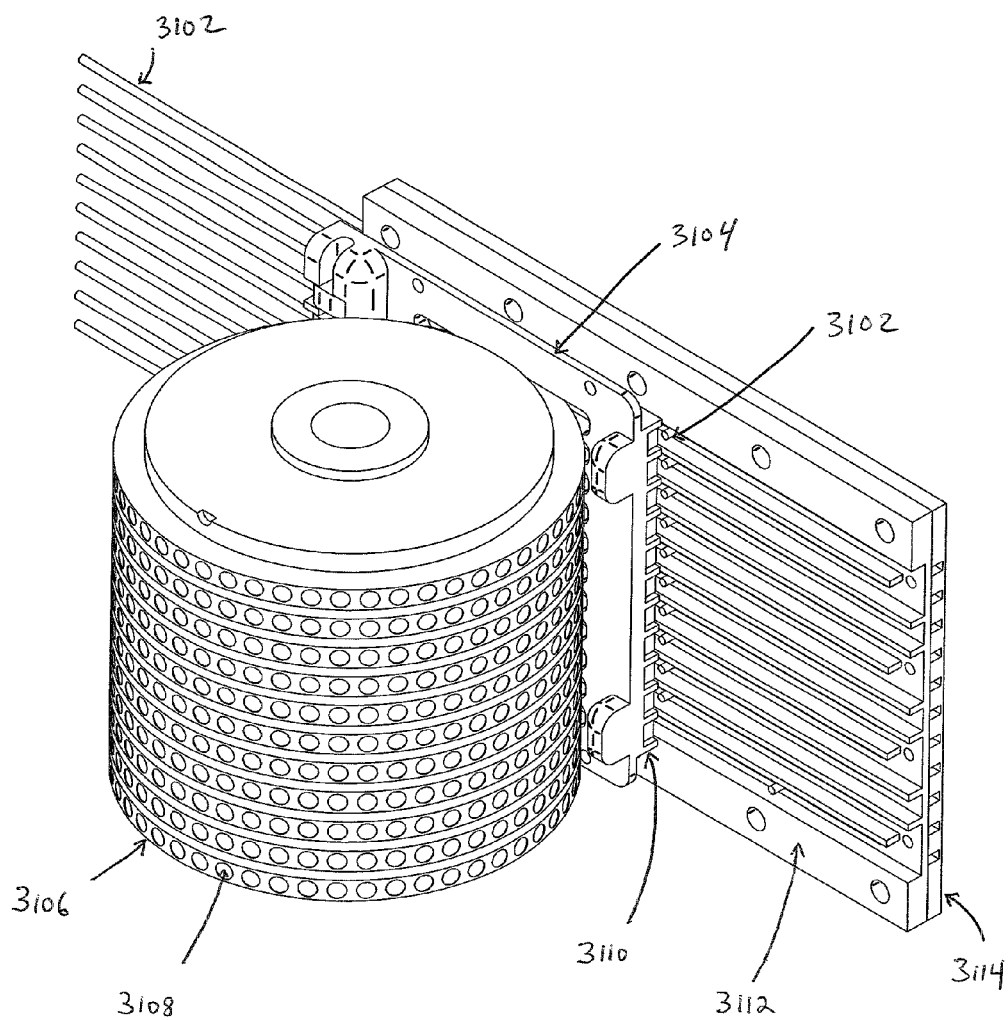
FIG. 31 is a diagram illustrating a perspective view of the selector wheel and guide block assemblies in accordance with one embodiment of the present invention.

FIG. 31 is a diagram 3100 illustrating a perspective view of the selector wheel and guide block assemblies. Pull wires 3102 run through top guide block 3112 and bottom guide block 3114. Selector wheel 3106, with magnets 3108, engages push arms 3110 through engagement plate 3104.

Figure 32:
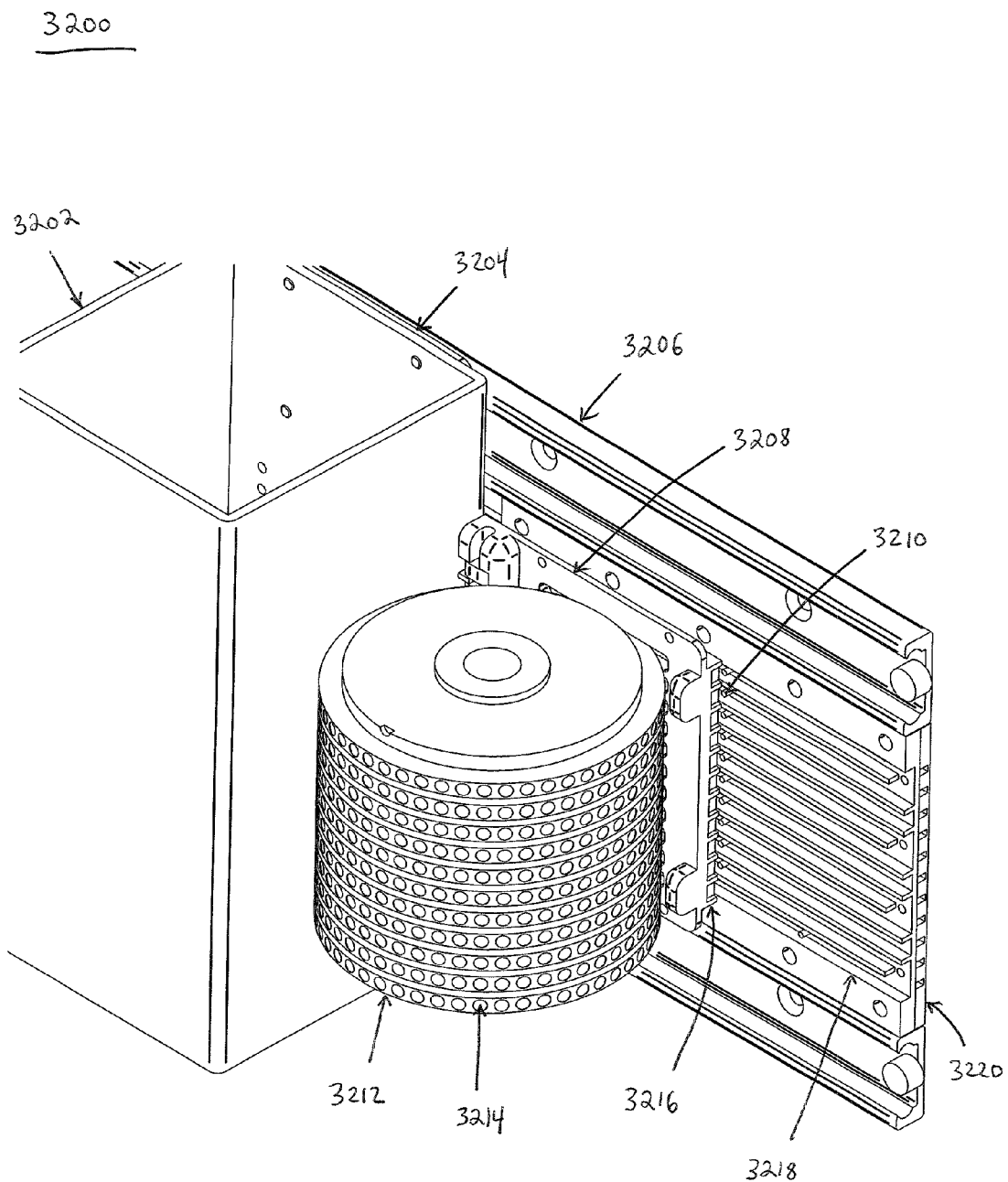
FIG. 32 is a diagram illustrating a perspective view of the selector wheel and guide block assemblies along with a guide rail and drawer in accordance with one embodiment of the present invention.

FIG. 32 is a diagram 3200 illustrating a perspective view of the selector wheel and guide block assemblies along with a guide rail and drawer. Pull wires 3210 run through top guide block 3218 and bottom guide block 3220. Selector wheel 3212, with magnets 3214, engages push arms 3216 through engagement plate 3208. Drawer 3202 is mounted on guide rail 3206 with rollers 3204. The engagement plate 3208, push arms 3216 and selector wheel 3212 are mounted to a shuttle (not shown). The top guide block 3218, bottom guide block 3220 and pull wires 3210 are mounted to a back panel (not shown).

Figure 33:
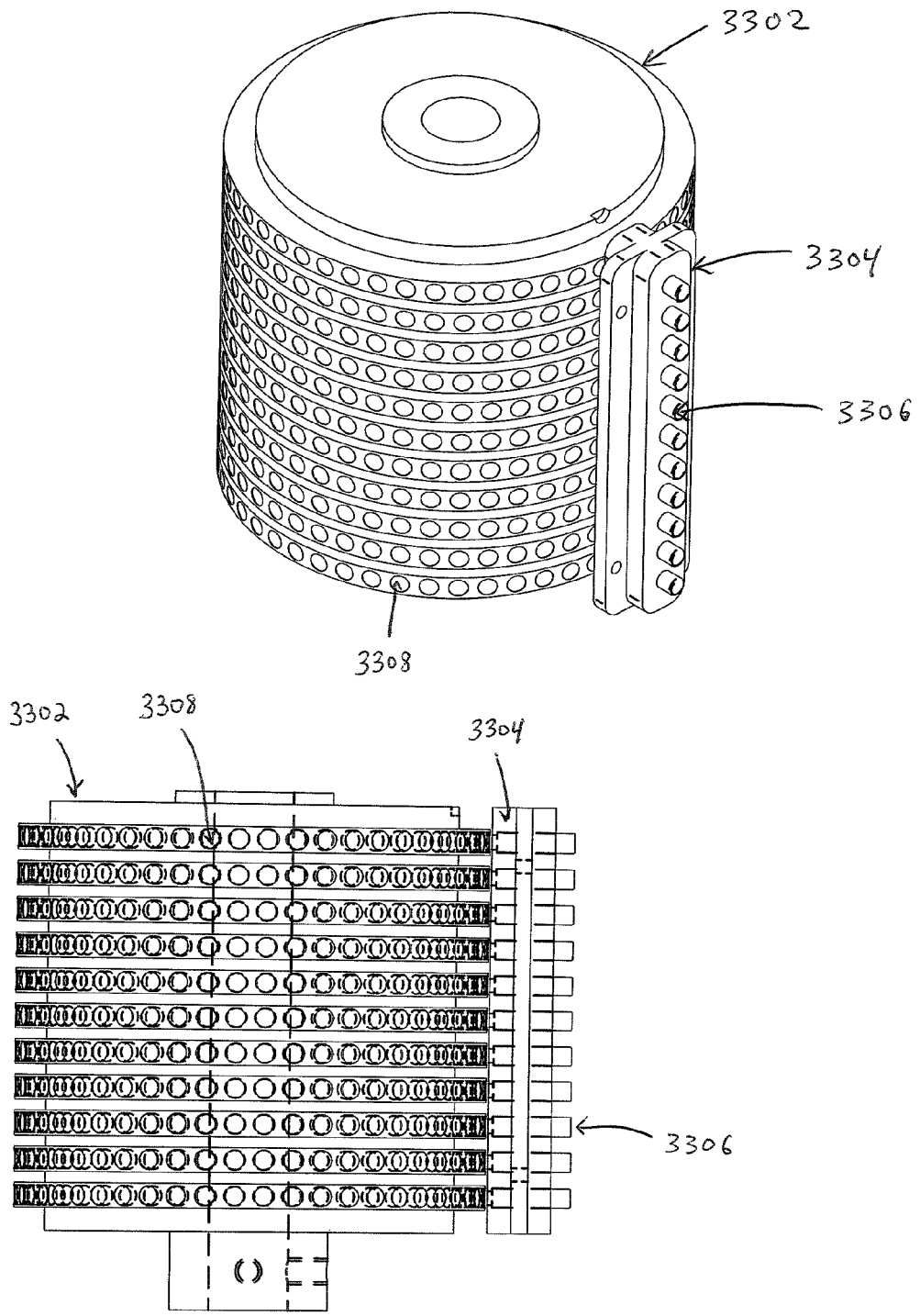
FIG. 33 is a diagram illustrating the selector wheel and plunger block in accordance with one embodiment of the present invention.

FIG. 33 is a diagram 3300 illustrating the selector wheel and plunger block. In an alternative embodiment, when the selector wheel 3302 is indexed, magnets on the selector wheel 3308 align with magnets 3306 in the plunger block 3304. Depending on the orientation of the magnetic poles, the plunger block magnets 3306 will extend or retract. When extended, they will engage pull wires.

Figure 34:
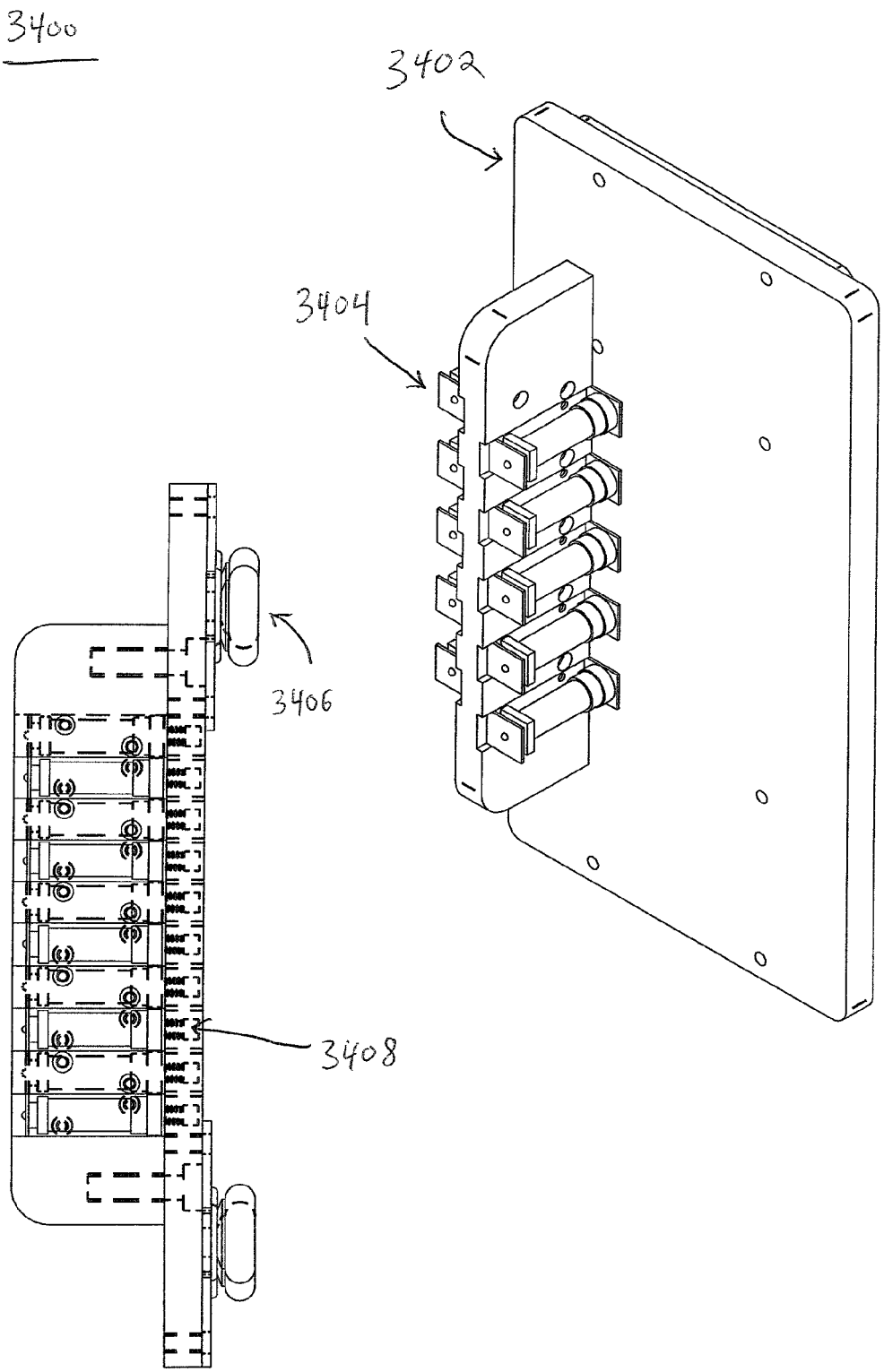
FIG. 34 is a diagram illustrating the use of solenoids in accordance with one embodiment of the present invention.

FIG. 34 is a diagram 3400 illustrating an alternative embodiment based on the use of solenoids. Engagement plate 3402 contains solenoids 3404. Solenoid rods 3408 extend to engage pull wires and retract to clear pull wires. The engagement plate 3402 has rollers 3406.

Figure 35:
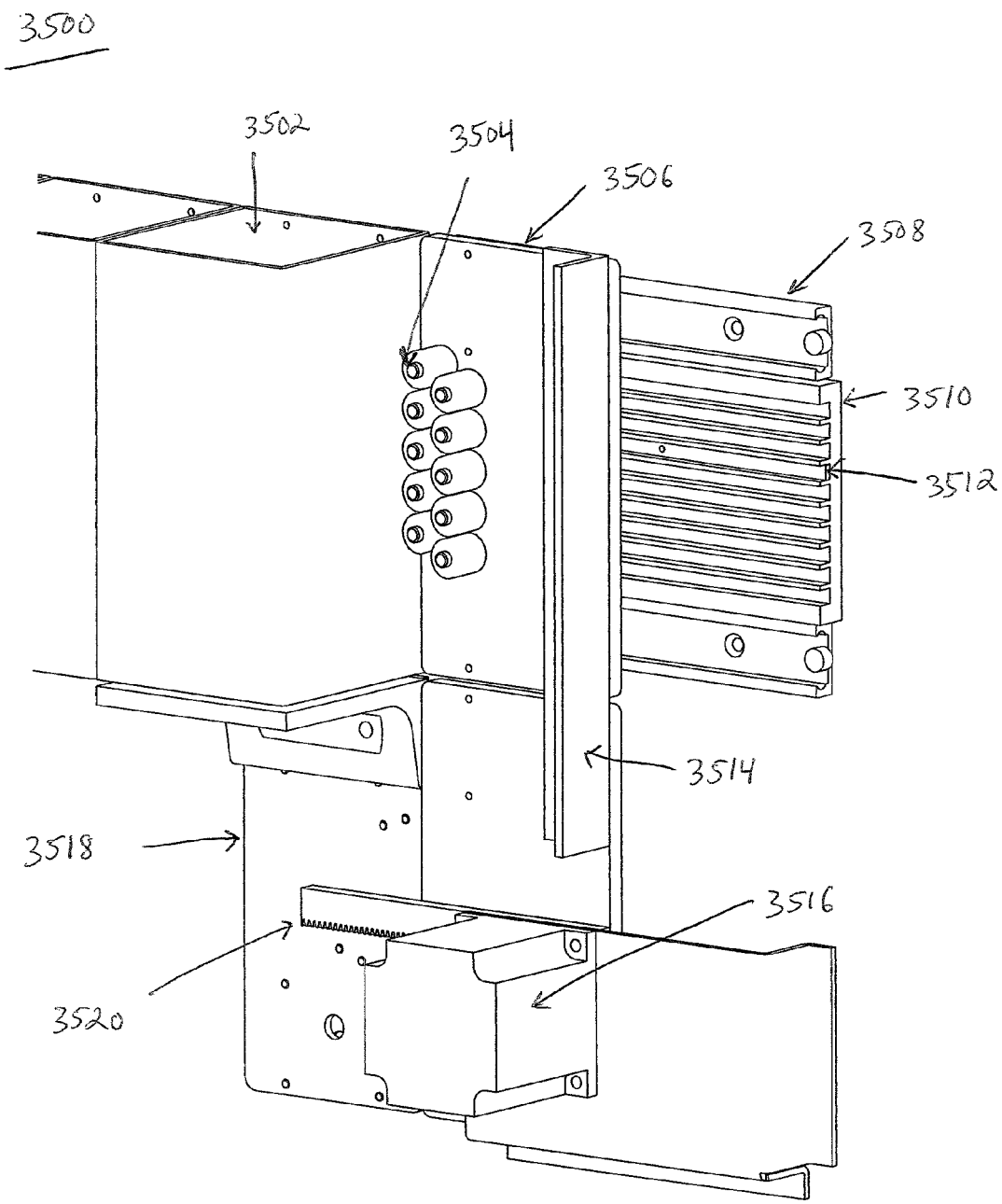
FIG. 35 is a diagram illustrating solenoid engagement along with a stepper motor assembly in accordance with one embodiment of the present invention.

FIG. 35 is a diagram 3500 illustrating the solenoid engagement embodiment along with a stepper motor assembly. Guide block 3510, pull wires 3512, and guide rails 3508 are shown behind engagement plate 3506 with solenoids 3504. End drawer 3502 is shown above bottom drawer 3518. Bracket 3514 attaches engagement plate 3506 to an assembly consisting of gear rack 3520 and stepper motor 3516. The solenoid engagement plates travel on rollers (not shown) but are affixed to each other by a bracket and move as one unit by the stepper motor and gear rack.

Figure 36:
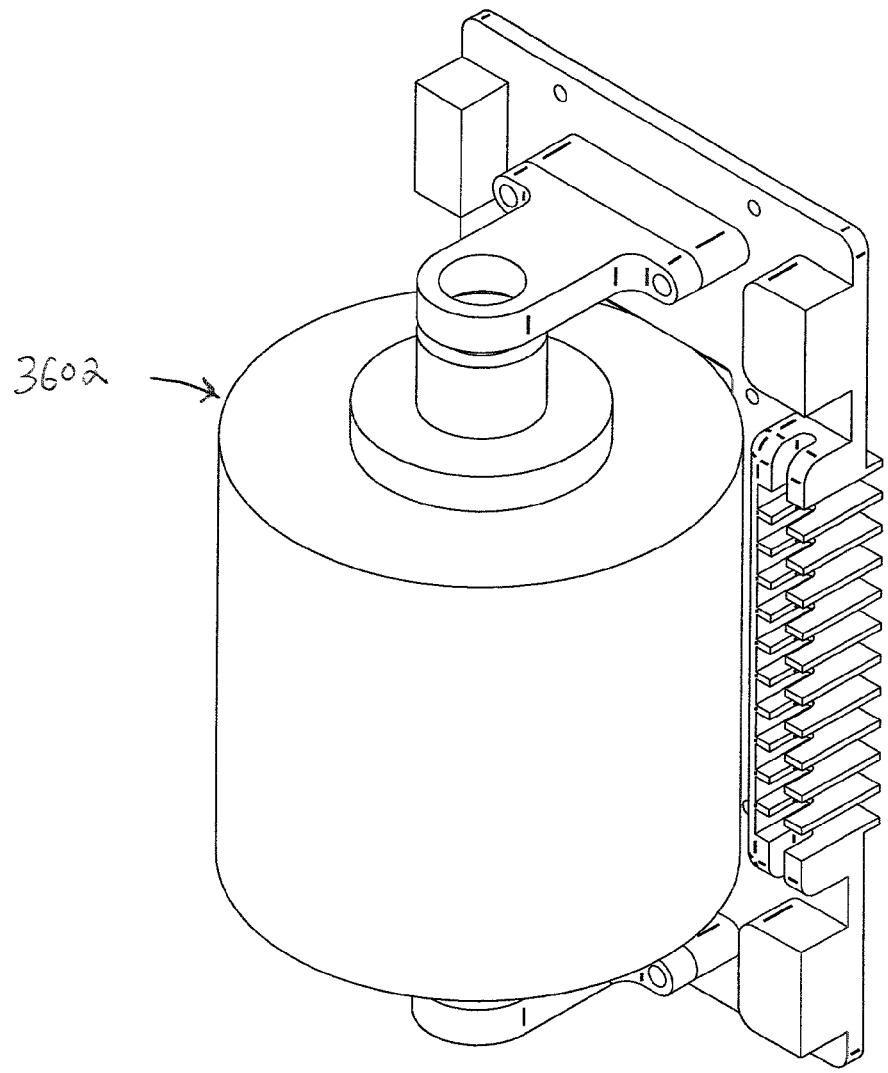
FIG. 36 is a diagram illustrating a metal selector wheel in accordance with one embodiment of the present invention.

FIG. 36 is a diagram 3600 illustrating a metal selector wheel in an alternative embodiment. The all metal selector wheel 3602 has embedded magnets that, when aligned with the push arm magnets, cause them to repulse and engage the pull wires. When no magnets are aligned, the push arm magnets are naturally attracted to the metal selector wheel and disengage the pull wires.

Figure 37:
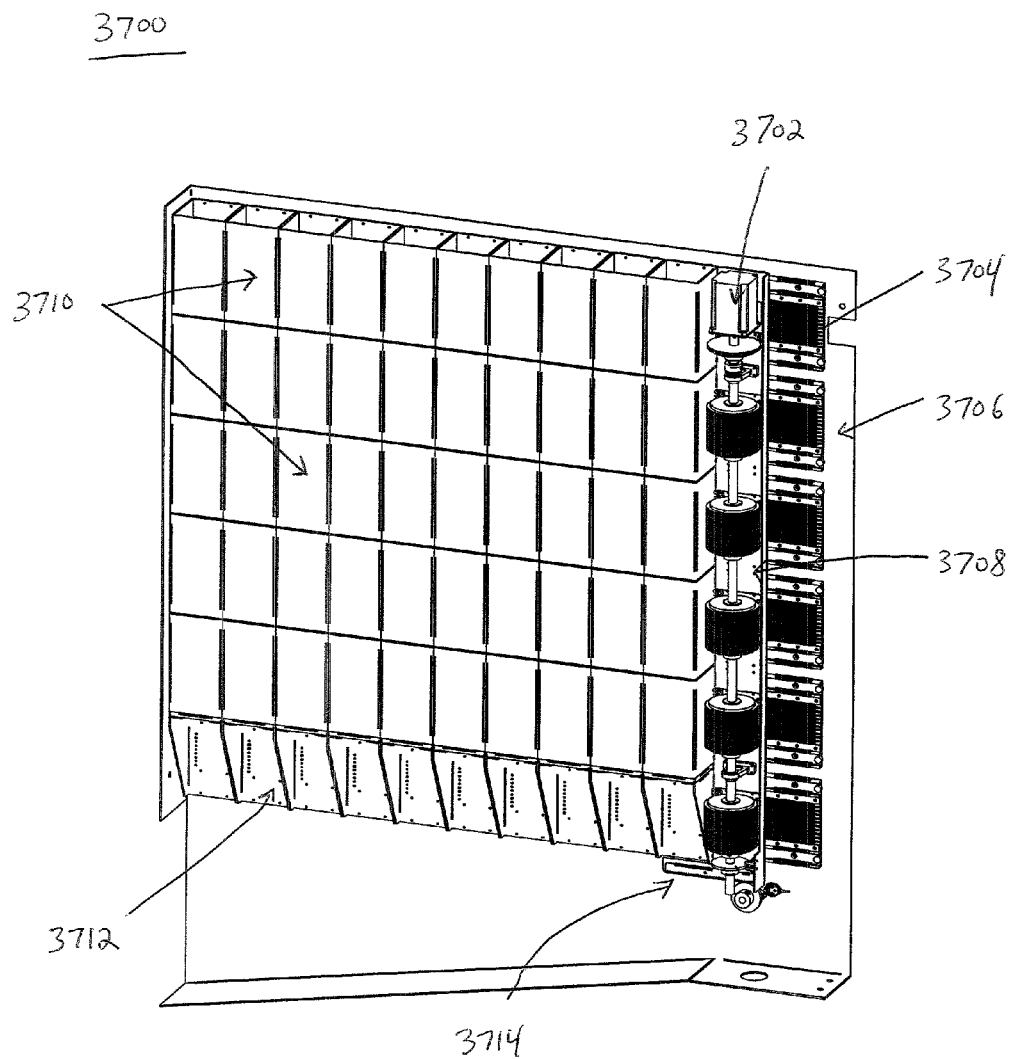
FIG. 37 is a diagram illustrating a slice of drawers and shuttle assembly in accordance with one embodiment of the present invention.

FIG. 37 is a diagram 3700 illustrating a slice of drawers and shuttle assembly. Rows of drawers 3710 arranged in a slice are shown along with a row of bottom drawers 3712. Guide block assembly with pull wires 3704 is mounted on back panel 3706. Stepper motor 3702 is provided for driving selector wheel shaft. A stepper motor for shuttle travel (not shown) turns a shaft that rotates the gear engaged with the gear rack 3714 mounted to the shuttle assembly 3708.

Selector wheel magnets are uniquely positioned for each selector wheel and each selector wheel is affixed to the shaft in the correct orientation. To operate, the stepper motor drives the selector wheel shaft indexes to one of 50 positions. Each position causes selector magnets to repulse corresponding push arm magnets, which force the push arms in to the guide block channel. The stepper motor then drives the shuttle the full travel length and returns. As the shuttle moves, any push arm in the guide block channel will push the pull wire and move the attached drawer. On the return stroke, the shuttle's trailing edge pushes all drawers back to the home position. Each index of the selector wheel shaft corresponds to a single drawer. To dispense a container from drawer number N, one only needs to index the shaft to position N and move the shuttle through its full motion.

Figure 38:
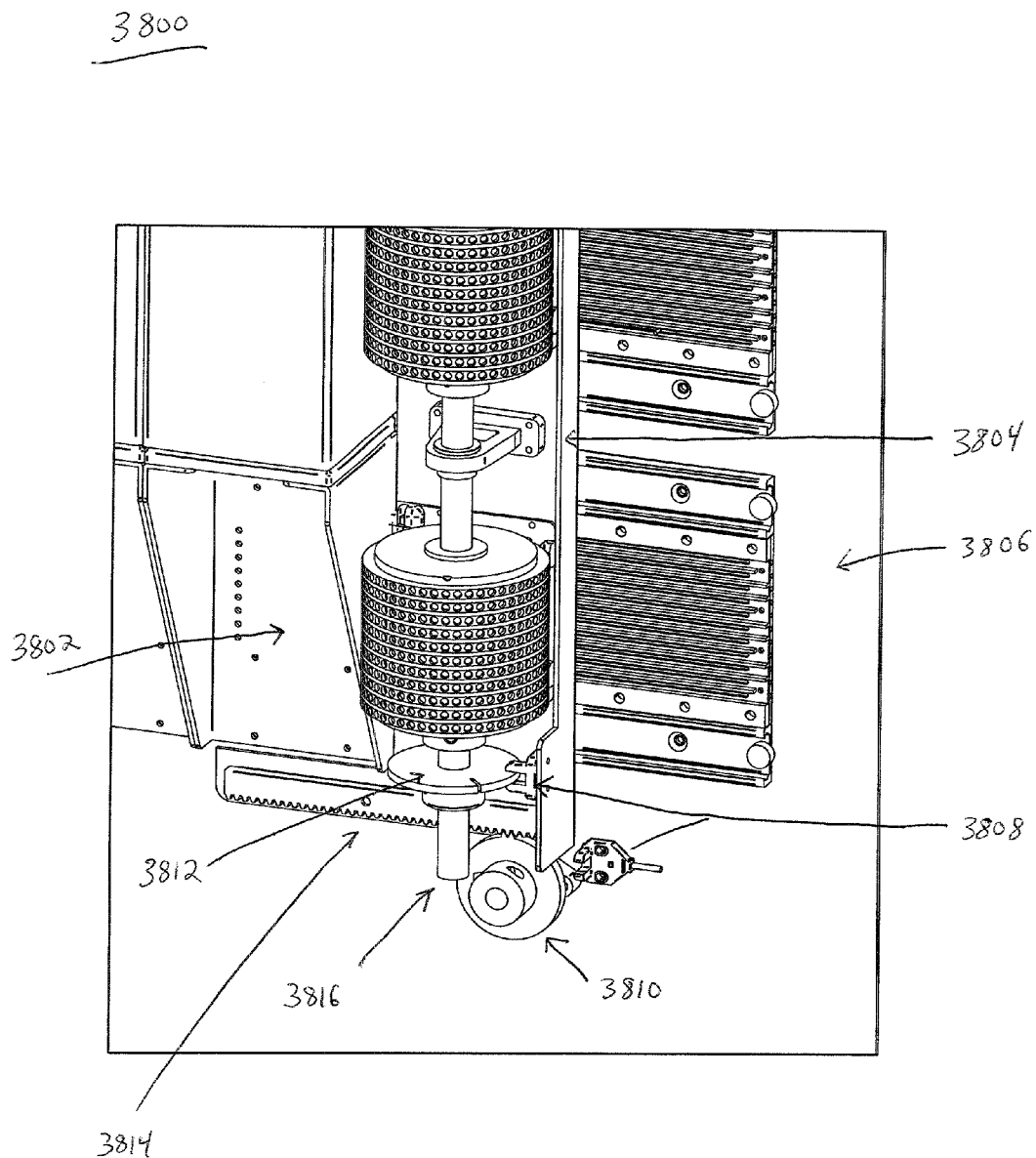
FIG. 38 is a diagram illustrating a detailed view of the bottom end corner of the slice of drawers in accordance with one embodiment of the present invention.

FIG. 38 is a diagram 3800 illustrating a detailed view of the bottom end corner of the slice of drawers. Back panel 3806, shuttle 3804, and bottom drawer 3802 are shown. Gear 3810 drives gear rack 3814. Also shown are photo sensor 3808, shaft 3816, and slit wheel 3812.

Figure 39:
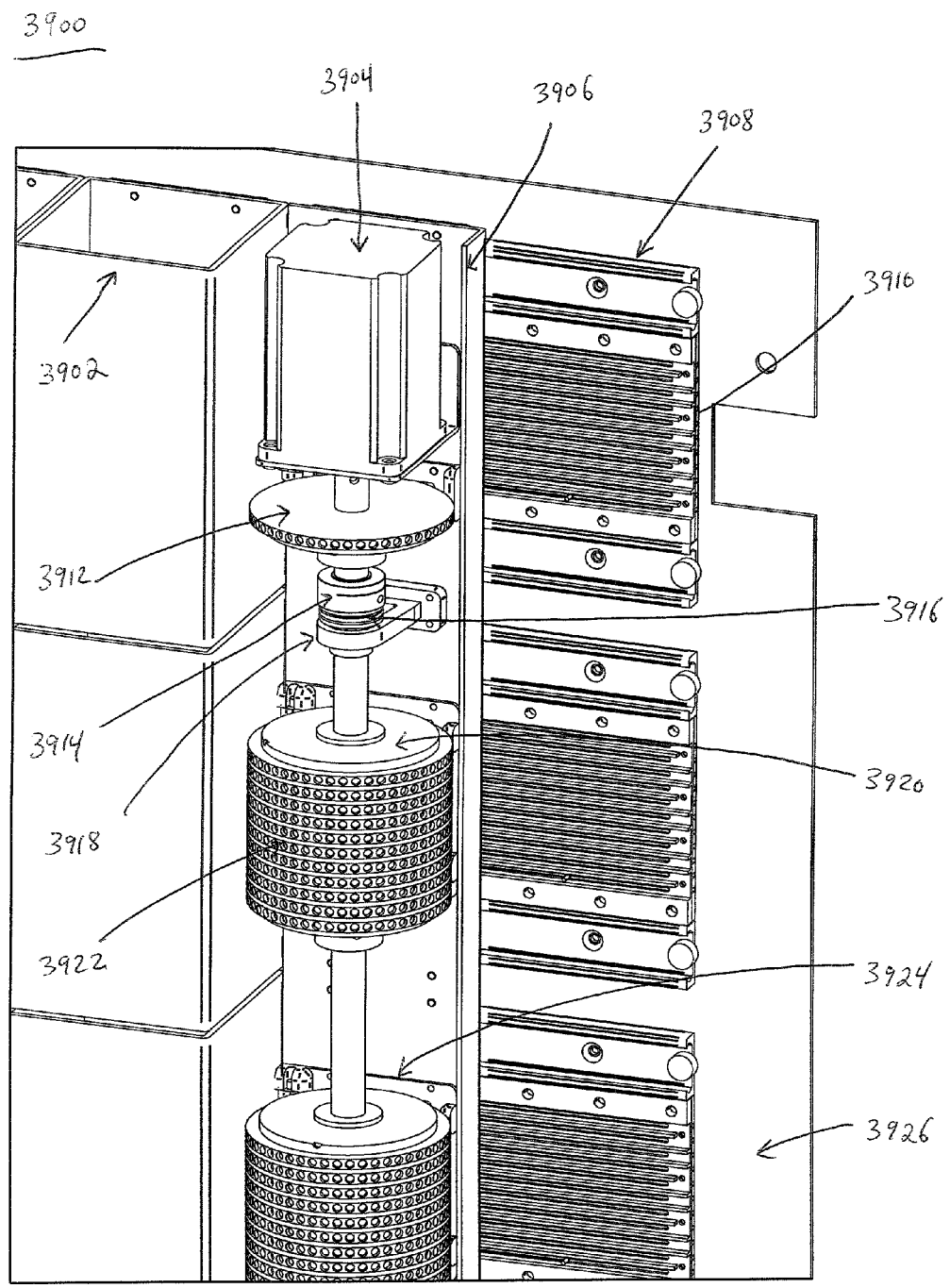
FIG. 39 is a diagram illustrating a detailed view of the top end corner of the slice of drawers in accordance with one embodiment of the present invention.

FIG. 39 is a diagram 3900 illustrating a detailed view of the top end corner of the slice of drawers. Shown are drawers 3902, stepper motor 3904, shuttle 3906, guide rail 3908, and pull wire guide block assembly 3910. Also shown are selector wheel single wire 3912, shaft collar 3914, bearing 3916, shaft support bracket 3918, selector wheel 3920, selector wheel magnets 3922, engagement plate 3924, and back panel 3926.

Figure 40:
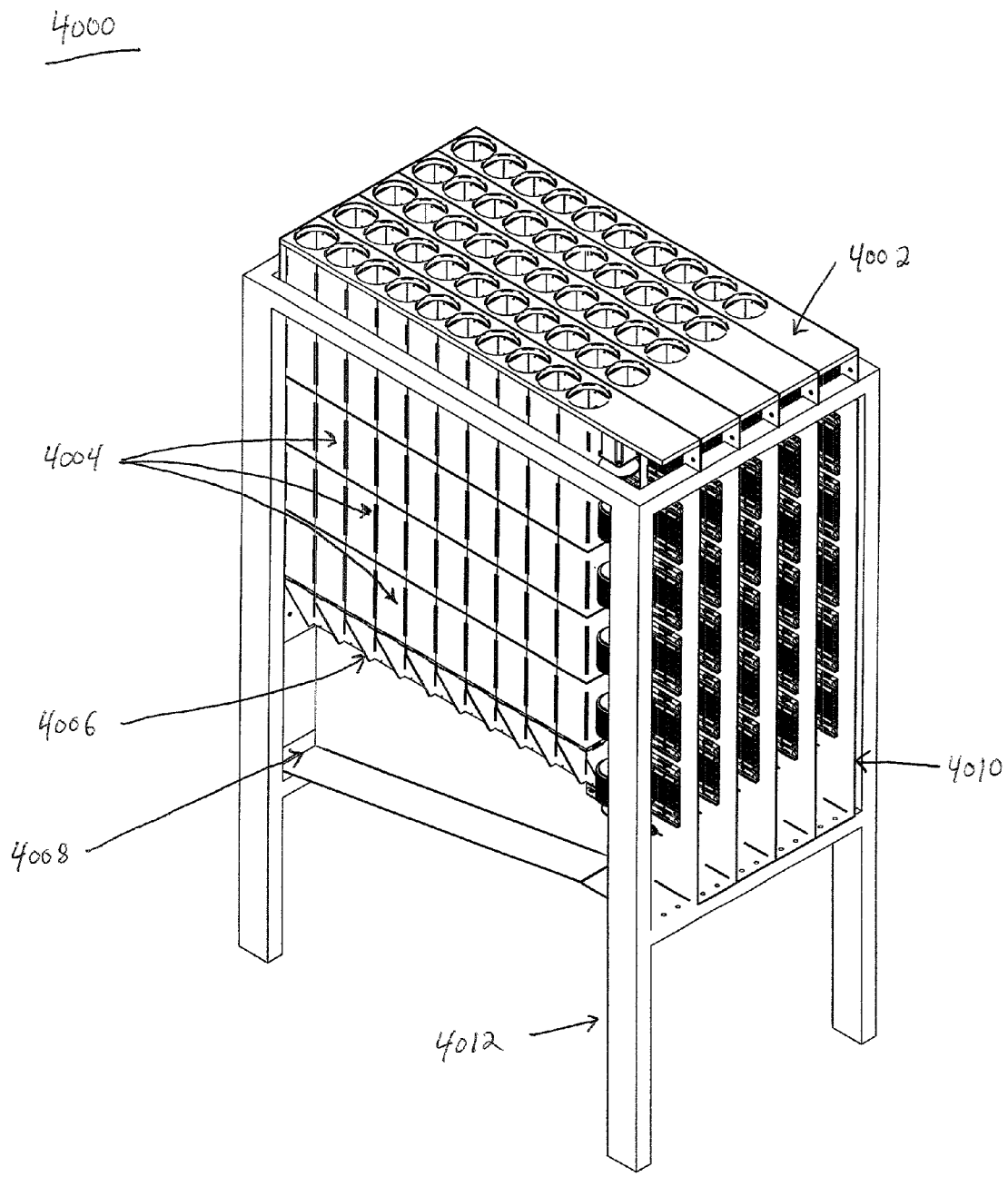
FIG. 40 is a diagram illustrating a 250 unit dispenser in accordance with one embodiment of the present invention.

FIG. 40 is a diagram 4000 illustrating a collection of five slices of drawers making up a 250 unit dispenser. Shown are top cap 4002, drawers 4004, bottom drawers 4006, exit chute 4008, back panel 4010 and frame 4012. The stepper motor that drives the shuttle assembly in one slice may also be used to drive the shuttles in other slices.

Figure 41:
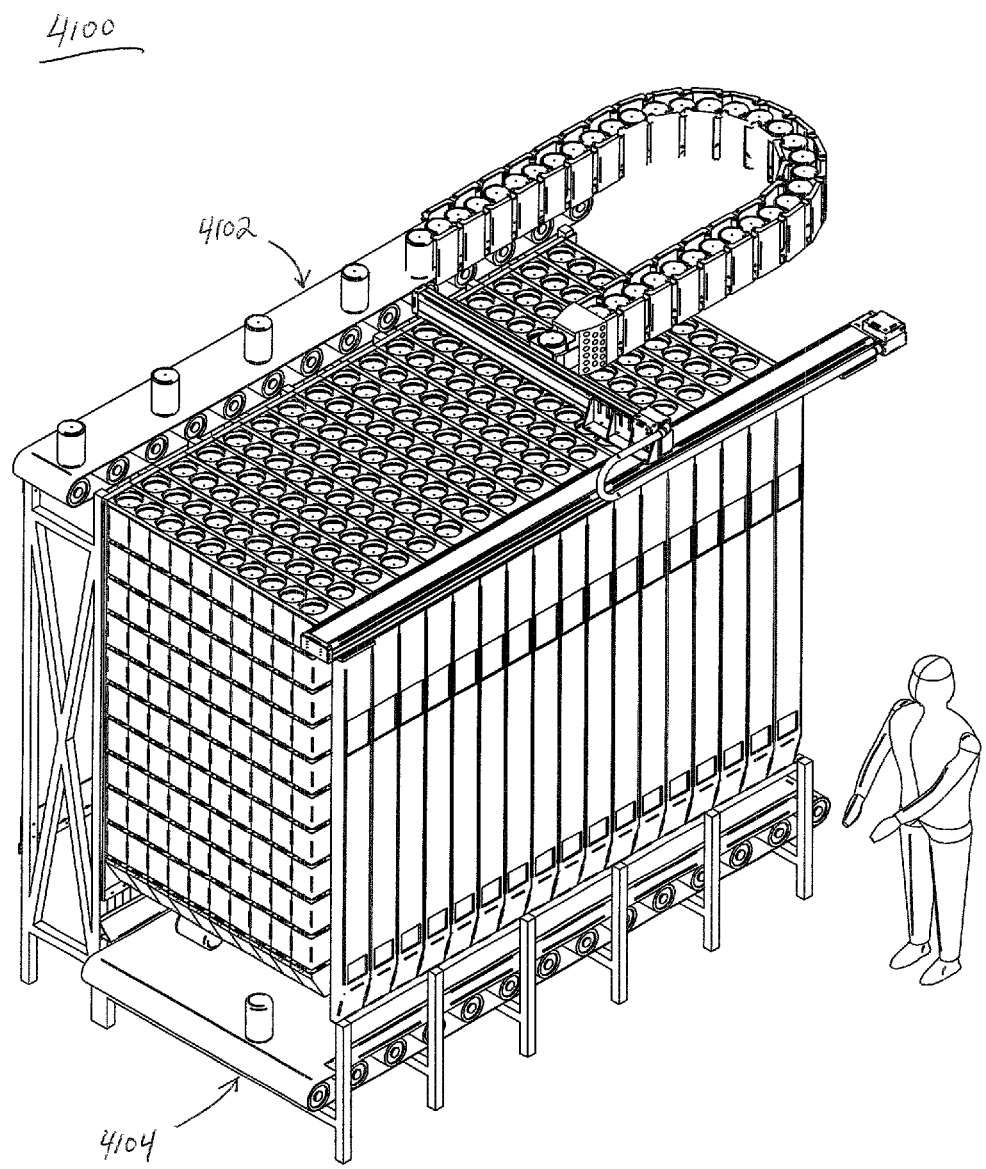
FIG. 41 is a diagram illustrating a larger dispenser system in accordance with one embodiment of the present invention.

FIG. 41 is a diagram 4100 illustrating a larger collection of slices and a conveyor belt 4102 at the top for feeding items to be stored, and a conveyor belt at the bottom 4104 for delivering items that have been dispensed.

Figure 42:
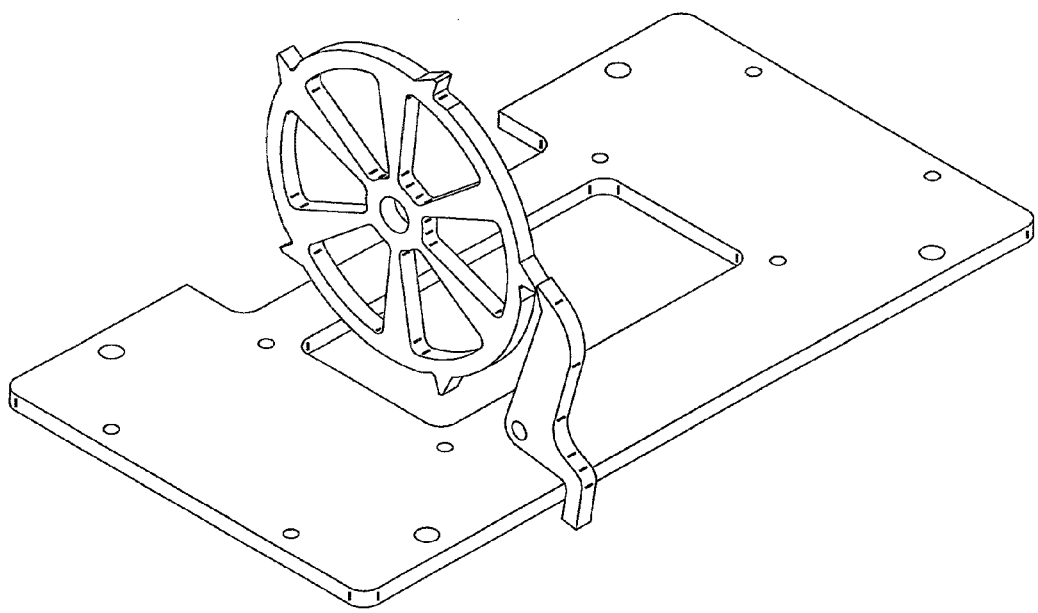
FIG. 42 is a diagram illustrating an alternative to the selector wheel in accordance with one embodiment of the present invention.

FIG. 42 is a diagram 4200 illustrating an alternative to the selector wheel.

Figure 43:
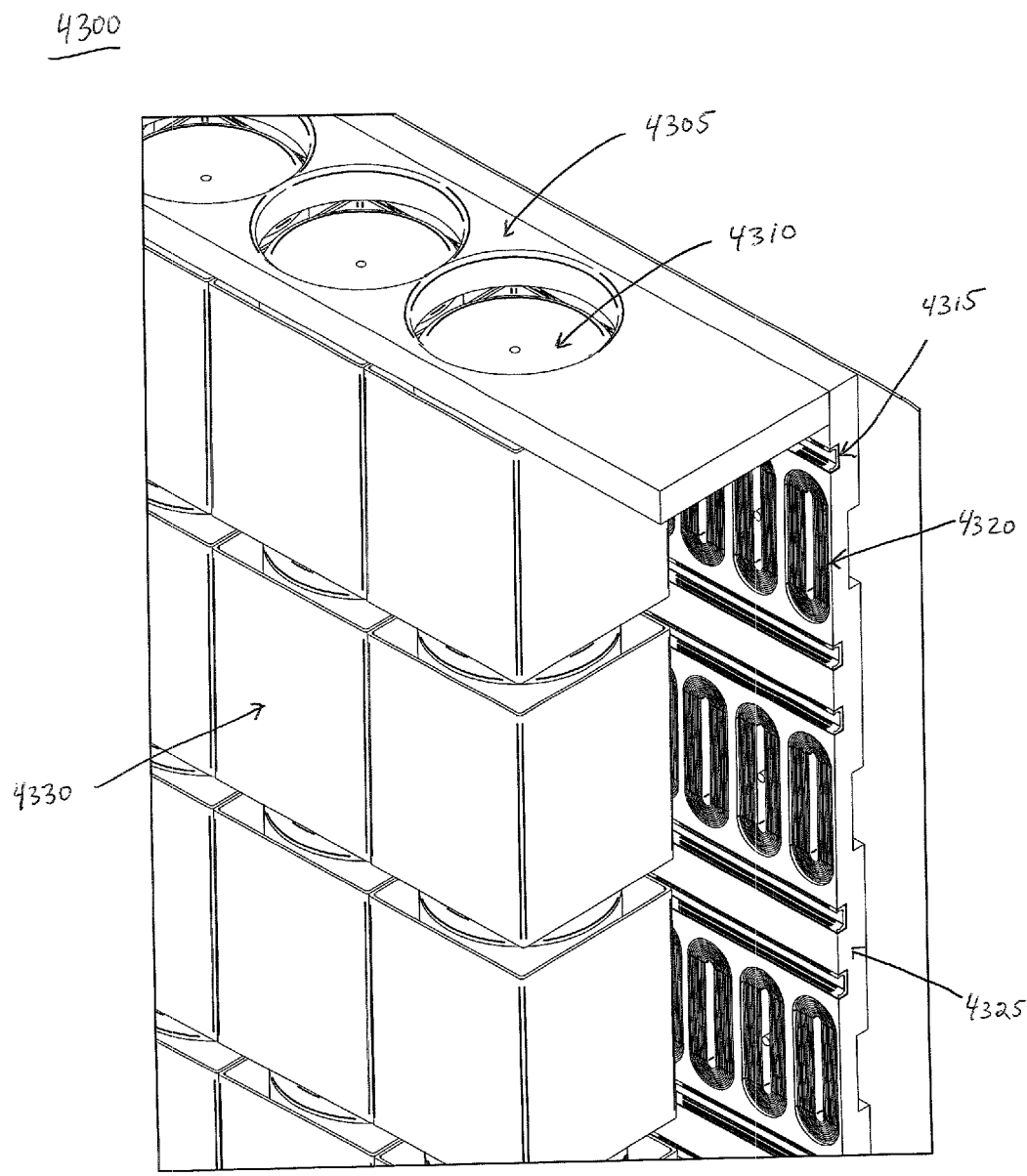
FIG. 43 is a perspective diagram illustrating an alternative embodiment of the invention comprising magnetic coils.

FIG. 43 is a perspective diagram 4300 illustrating an alternative embodiment of the invention comprising magnetic coils. A portion of a slice is shown with top cap 4305, containers 4310, guide rails 4315, magnetic coils 4320, back panel 4325, and drawers 4330. Magnet coils 4320 are energized to control movement of the drawers 4330. Coils can be activated to move the drawers a full step, a half step or to provide locking.

Figure 44:
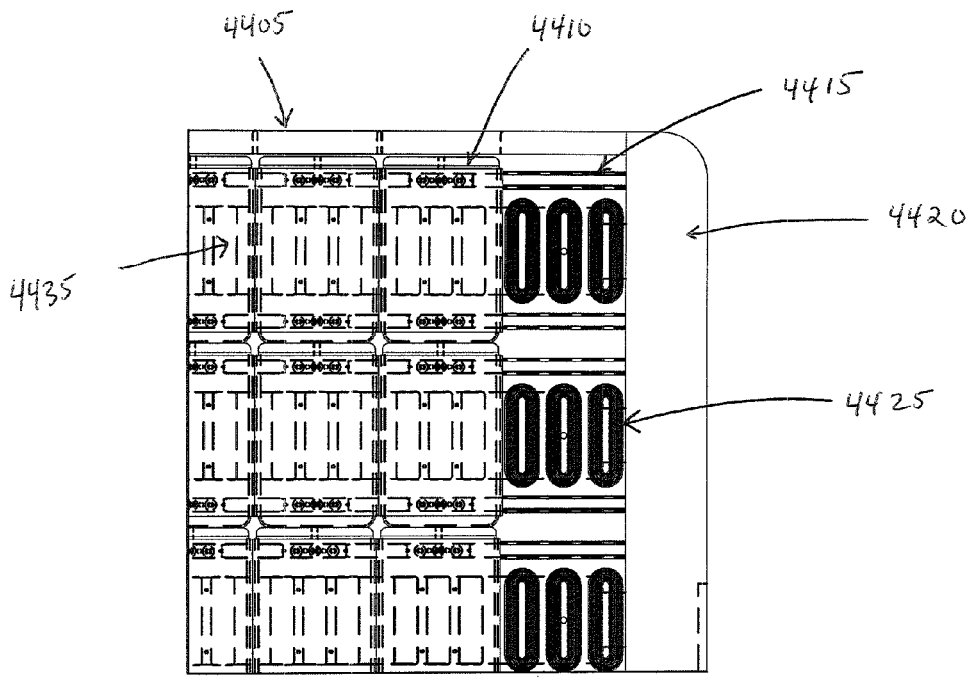
FIG. 44 is a front cut away view of the slice and a perspective view of the rear of the drawer according to the embodiment shown in FIG. 43.

FIG. 44 is a front cut away view of the slice and a perspective view of the rear of the drawer according to the embodiment shown in FIG. 43. Shown are top cap 4405, containers 4410, guide rails 4415, front control panel 4420, magnetic coils 4425, drawers 4435, roller assembly 4440 and magnet assembly 4445. Roller assemblies 4440 engage in guide rails 4415 permitting drawers to roll back and forth under the constraints imposed by the magnet assemblies 4445 and magnet coils 4425.

Figure 45:
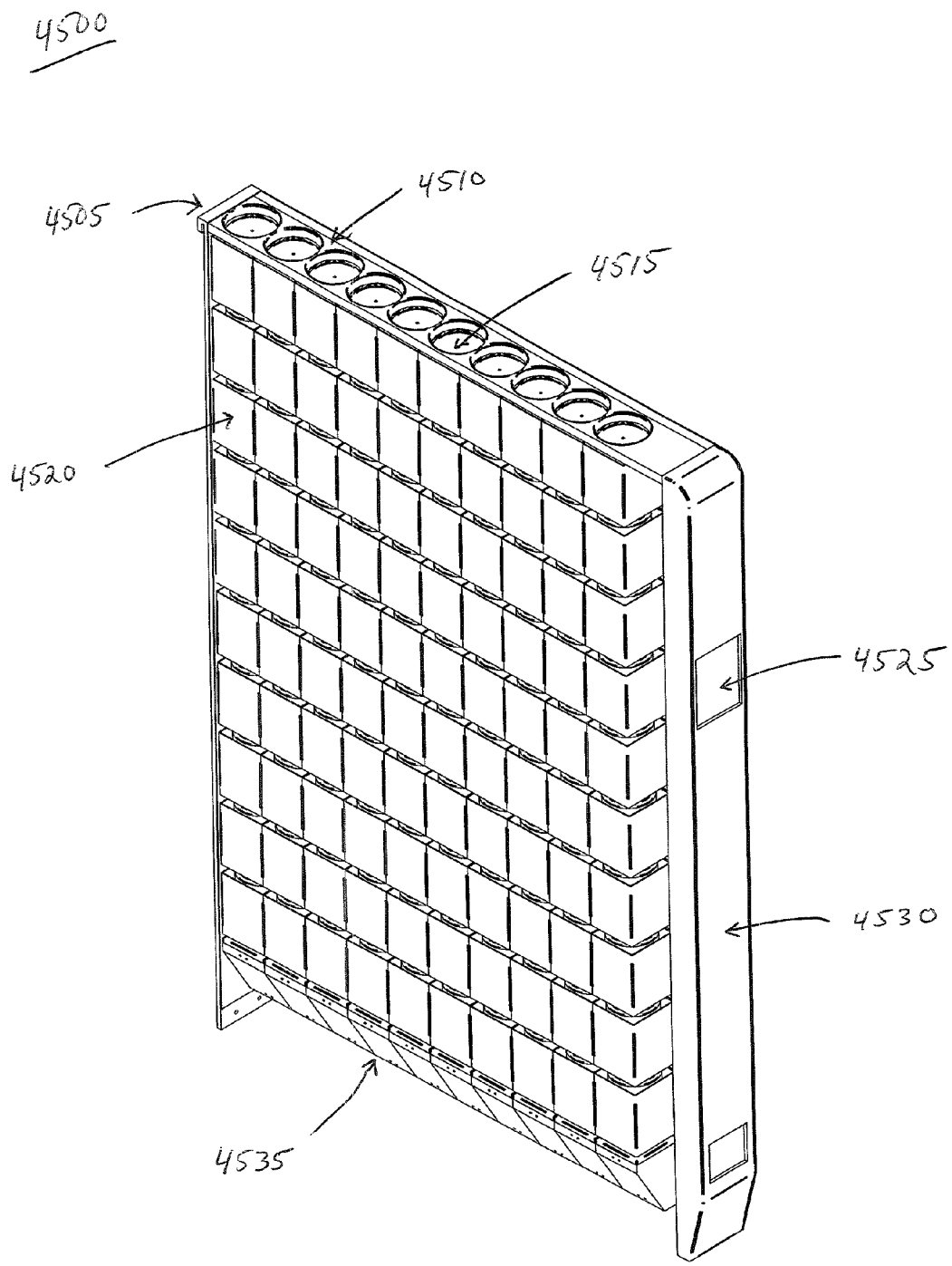
FIG. 45 is a perspective view of a full slice 4500 according to the embodiment shown in FIG. 43.

FIG. 45 is a perspective view of a full slice 4500 according to the embodiment shown in FIG. 43. Shown are mounting frame 4505, top cap 4510, containers 4515, drawers 4520, control display 4525, front panel 4530 and bottom drawers 4535.

Figure 46:
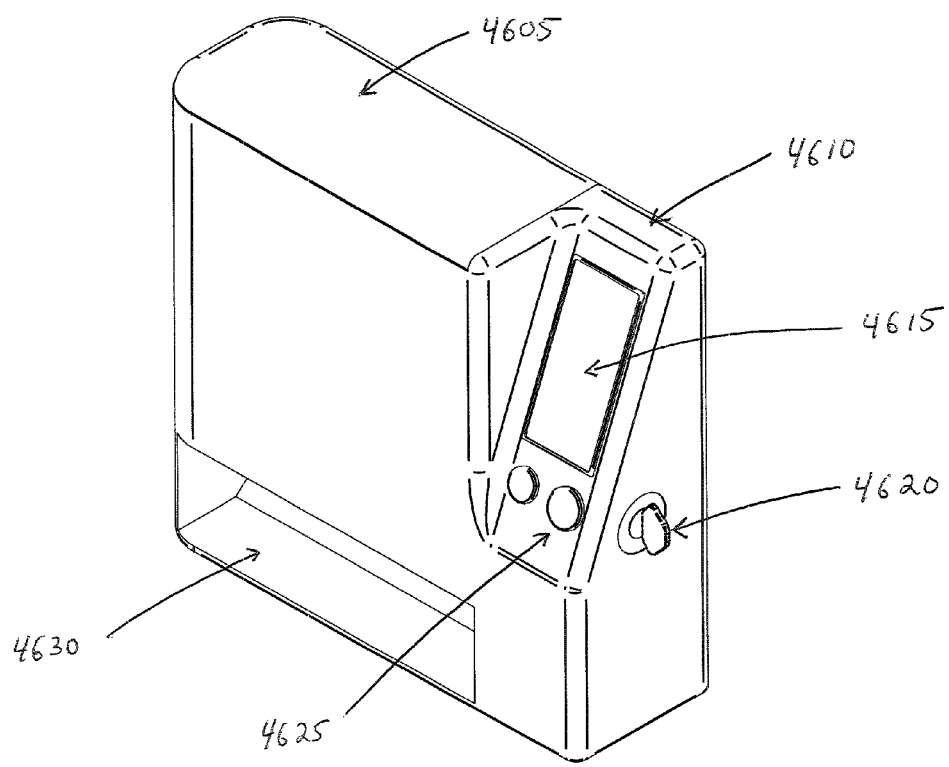
FIG. 46 is a perspective diagram 4600 illustrating an alternative embodiment of the invention suitable for home use.
Figure 46:
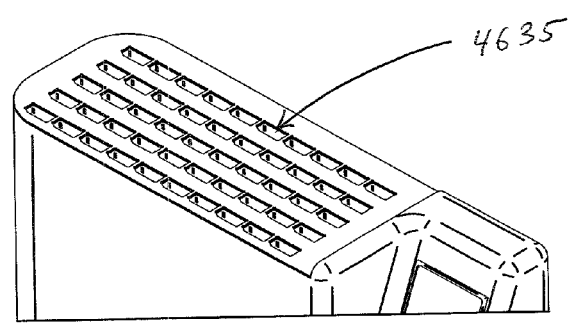

FIG. 46 is a perspective diagram 4600 illustrating an alternative embodiment of the invention suitable for home use. Shown are top cover 4605, plastic housing 4610, display 4615, memory key 4620, control buttons 4625, exit chute 4630. Openings for pill containers 4635 are shown with the top cover 4605 removed. The openings may be keyed so that containers fit in only one orientation. This embodiment is a smaller scale version suitable to dispense medications and oral solids to home users.

As will be realized, the invention is capable of other and different embodiments, and its several details are capable of modifications in various obvious respects, all without departing from the essence of the invention. For instance, the invention may be practiced as an apparatus and/or process, and can be scaled. There is within the scope of the invention, a system for the storing and dispensing of items comprising a plurality of drawers arranged in a horizontal row, a plurality of the horizontal rows vertically stacked to form a slice of drawers and a sliding mechanism permitting at least one of the plurality of drawers to slide along the direction parallel to the long axis of the horizontal row, opening a dispensing path through the slice of drawers for a selected first item stored in a selected drawer to exit the system by non-contact force such as gravity. The sliding mechanism further permits the opening of an entrance path through the slice of drawers for a second item to enter the system to be stored in a second selected drawer by non-contact force. A plurality of slices of drawers may be arranged next to each other in close proximity forming a densely packed three dimensional matrix of drawers permitting minimal and efficient use of storage space. The drawers may be mounted on guide rails. The sliding mechanism may be a motor coupled to the drawers through a mechanism to transmit pulling force. The coupling may be a pull chain, a pull rod, a flexible belt or a pull wire. In some embodiments the motor may be a stepper motor. In other embodiments the motor may be a linear motor. The coupling may be selectively engaged by a solenoid, an air cylinder or an indexed disk driven by a second motor which may be a stepper motor or a linear motor.

The sliding mechanism may further comprise a pull wire, a motor coupled to the pull wire and a magnet to selectively engage the pull wire to one of the drawers so that the pulling force from the motor is transmitted to the drawer. The motor may be a stepper motor or a linear motor. The magnets may be deployed on a selector wheel in a geometrical arrangement such that desired combinations of drawers are simultaneously engaged to the pull wires while other drawers are released from the pull wires. Various desired combinations may be selected by rotating the selector wheel. The rotation may be accomplished with a second motor which may be a stepper motor or a linear motor.

A protective container may be available for securing the items to be stored and dispensed.

There is further within the scope of the invention, a method for storing and dispensing items in a dispenser comprising a plurality of drawers. The method comprises placing an item to be stored in a random location within the dispenser and associating the item with the random location, identifying an item to be dispensed, locating it, and shifting at least one of the plurality of drawers based on the location of the item to be dispensed so that the item is permitted to exit the dispenser by non-contact force such as gravity. At least one of the plurality of drawers may be locked based on the location of the item to be dispensed. The item to be stored may be placed in a protective container prior to storing in the random location. The locating may be accomplished through the use of RFID tracking of the item. The shifting may be accomplished by sliding the drawer on guide rails. The sliding may be accomplished by selectively engaging the drawer to a pull wire which is coupled to a motor. The engaging may be accomplished with a magnet.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for storing and nonlinear dispensing of items, said system comprising:
    a plurality of drawers arranged in a horizontal row;
    each said drawer comprising a single receptacle comprising an open top and an open bottom defined by sides, each said drawer with one volume for enclosing contents;
    a plurality of said horizontal rows vertically stacked to form a slice of drawers, whereby each of said vertically stacked rows of drawers contains multiple, individual and individually movable said drawers; and
    a sliding mechanism permitting at least one of said plurality of drawers to slide only along the direction parallel to the long axis of said horizontal row, opening a dispensing path through said slice of drawers for a selected first item stored in a selected drawer in any of said plurality of horizontal rows to exit said system by non-contact force;
    wherein said sliding mechanism further comprises a motor and a coupling between said motor and said drawers to transmit pulling force;
    said drawers each dispenses said items directly from any said drawer of any said row, thereby providing said nonlinear dispensing.

2. The system of claim 1 wherein said sliding mechanism further permits the opening of an entrance path through said slice of drawers for a second item to enter said system to be stored in a second selected drawer by non-contact force.

3. The system of claim 1 further comprising a plurality of said slice of drawers, arranged to form a three dimensional matrix of drawers.

4. The system of claim 1 wherein said drawers are mounted on guide rails.

5. The system of claim 1 wherein said coupling is one of a pull chain, a pull rod, a flexible belt or a pull wire.

6. The system of claim 1 wherein said motor is a stepper motor.

7. The system of claim 1 wherein said coupling is selectively engaged by one of a solenoid, an air cylinder or an indexed disk driven by a second motor.

8. The system of claim 1 wherein said sliding mechanism further comprises:
    a pull wire;
    said motor coupled to said pull wire; and
    a magnet to selectively engage said pull wire to one of said drawers, whereby pulling force from said motor is transmitted to said drawer.

9. The system of claim 8 further comprising a selector wheel upon which a plurality of magnets are deployed in a geometrical arrangement such that combinations of said drawers are engaged to said pull wires.

10. The system of claim 9 wherein said combination may be changed by rotation of said selector wheel.

11. The system of claim 10 further comprising a second motor to rotate said selector wheel.

12. The system of claim 1 further comprising a container to protect said items within said system.

13. A method for storing and dispensing items in a dispenser comprising:
    providing said dispenser;
    said dispenser comprising a plurality of drawers arranged in a horizontal row;
    each said drawer comprising a single receptacle comprising an open top and an open bottom defined by sides each said drawer with one volume for enclosing contents;
    a plurality of said horizontal rows vertically stacked to form a slice of drawers, whereby each of said vertically stacked rows of drawers contains multiple, individual and individually movable said drawers;
    a sliding mechanism permitting at least one of said plurality of drawers to slide only along the direction parallel to the long axis of said horizontal row, opening a dispensing path through said slice of drawers for a selected first item stored in a selected drawer in any of said plurality of horizontal rows to exit said system by non-contact force;
    wherein said sliding mechanism further comprises a motor and a coupling between said motor and said drawers to transmit pulling force;
    said drawers each dispenses said items directly from any said drawer of any said row, thereby providing said nonlinear dispensing;
    said method comprising the steps of:
    placing an item to be stored in said dispenser in a random location within said dispenser in one of said drawers;
    associating said item to be stored with said random location within said dispenser in one of said drawers;
    identifying an item to be dispensed;
    locating said item to be dispensed in said dispenser; and shifting at least one of said plurality of drawers based on location of said item to be dispensed, whereby said item to be dispensed is permitted to exit said dispenser by non-contact force.

14. The method of claim 13 further comprising locking at least one of said plurality of drawers based on location of said item to be dispensed.

15. The method of claim 13 further comprising placing said item to be stored in a protective container prior to placing in said random location within said dispenser in one of said drawers.

16. The method of claim 13 wherein said locating is accomplished by RFID tracking of said item to be dispensed.

17. The method of claim 13 wherein said coupling comprises a pull wire, and said sliding is accomplished by selectively engaging said drawer to said pull wire, wherein said pull wire is coupled to said motor.

18. The method of claim 17 wherein said selective engaging is accomplished by a magnet.

19. The system of claim 1 wherein said motor is a linear motor.

20. An apparatus for storing and nonlinear dispensing of items, said apparatus comprising:

a plurality of drawers arranged in a horizontal row;

each said drawer comprising a single receptacle comprising an open top and an open bottom defined by sides, each said drawer with one volume for enclosing contents;

a plurality of said horizontal rows vertically stacked to form a slice of drawers, whereby each of said vertically stacked rows of drawers contains multiple, individual and individually movable said drawers; and a sliding mechanism permitting at least one of said plurality of drawers to slide only along the direction parallel to the long axis of said horizontal row, opening a dispensing path through said slice of drawers for a selected first item stored in a selected drawer in any of said plurality of horizontal rows to exit said system by non-contact force, wherein said sliding mechanism further comprises a motor and a coupling between said motor and said drawers to transmit pulling force;

whereby each of said drawers dispenses said items directly from any said drawer of any said row, thereby providing said nonlinear dispensing.

* * * * *